US012037521B2

(12) United States Patent
Deng et al.

(10) Patent No.: US 12,037,521 B2
(45) Date of Patent: Jul. 16, 2024

(54) ADHESIVE COMPOSITIONS WITH POLYESTERS COMPRISING 2,2,4,4-TETRAALKYL-1,3-CYCLOBUTANEDIOL AND METHODS OF MAKING THE SAME

(71) Applicant: Eastman Chemical (China) Co., Ltd., Pudong New District (CN)

(72) Inventors: Liu Deng, Kingsport, TN (US); Emmett Dudley Crawford, Kingsport, TN (US); Wentao Li, Kingsport, TN (US); John Thorton Maddox, Jonesborough, TN (US); Christopher Harlan Burk, Gray, TN (US); Cheng Wei Zhu, Yangzhong (CN); Kujtim Bizati, Johnson City, TN (US); Bing Yuan, Methuen, MA (US); Dayu Zhang, Shanghai (CN); Tara Renee Cary, Johnson City, TN (US); Thauming Kuo, Kingsport, TN (US)

(73) Assignee: Eastman Chemical (China) Co., Ltd.

( * ) Notice: Subject to any disclaimer, the term of this patent is extended or adjusted under 35 U.S.C. 154(b) by 449 days.

(21) Appl. No.: 17/309,563

(22) PCT Filed: Dec. 6, 2019

(86) PCT No.: PCT/CN2019/123685
§ 371 (c)(1),
(2) Date: Jun. 4, 2021

(87) PCT Pub. No.: WO2020/114492
PCT Pub. Date: Jun. 11, 2020

(65) Prior Publication Data
US 2022/0033688 A1 Feb. 3, 2022

Related U.S. Application Data

(60) Provisional application No. 62/776,179, filed on Dec. 6, 2018.

(51) Int. Cl.
| | | |
|---|---|---|
| C09J 7/35 | (2018.01) | |
| B32B 7/12 | (2006.01) | |
| C08G 18/12 | (2006.01) | |
| C08G 18/30 | (2006.01) | |
| C08G 18/42 | (2006.01) | |
| C08G 18/73 | (2006.01) | |
| C08G 18/75 | (2006.01) | |
| C08G 18/76 | (2006.01) | |
| C08G 63/181 | (2006.01) | |
| C08G 63/199 | (2006.01) | |
| C08G 63/672 | (2006.01) | |
| C09J 175/06 | (2006.01) | |
| C09J 175/08 | (2006.01) | |

(52) U.S. Cl.
CPC ............... *C09J 175/06* (2013.01); *B32B 7/12* (2013.01); *C08G 18/12* (2013.01); *C08G 18/307* (2013.01); *C08G 18/4216* (2013.01); *C08G 18/423* (2013.01); *C08G 18/425* (2013.01); *C08G 18/73* (2013.01); *C08G 18/755* (2013.01); *C08G 18/7657* (2013.01); *C08G 63/181* (2013.01); *C08G 63/199* (2013.01); *C08G 63/672* (2013.01); *C09J 7/35* (2018.01); *C09J 175/08* (2013.01); *B32B 2439/70* (2013.01); *C08G 2170/00* (2013.01); *C08G 2170/20* (2013.01); *C08G 2390/00* (2013.01); *C09J 2203/326* (2013.01); *C09J 2203/354* (2020.08); *C09J 2301/122* (2020.08); *C09J 2301/304* (2020.08); *C09J 2301/306* (2020.08); *C09J 2400/163* (2013.01); *C09J 2423/106* (2013.01); *C09J 2467/006* (2013.01); *C09J 2475/00* (2013.01)

(58) Field of Classification Search
USPC .......................................................... 528/88
See application file for complete search history.

(56) References Cited

U.S. PATENT DOCUMENTS

| | | | |
|---|---|---|---|
| 3,038,884 | A | 6/1962 | Martin et al. |
| 3,313,777 | A | 4/1967 | Elam et al. |
| 3,502,620 | A | 3/1970 | Caldwell |
| 4,150,206 | A | 4/1979 | Jourquin et al. |
| 4,859,760 | A | 8/1989 | Light, Jr. et al. |
| 5,023,367 | A | 6/1991 | Calbo, Jr. et al. |
| 5,288,820 | A | 2/1994 | Rector, Jr. et al. |
| 5,393,840 | A | 2/1995 | Kuo |

(Continued)

FOREIGN PATENT DOCUMENTS

| | | |
|---|---|---|
| CN | 102250577 A | 11/2011 |
| CN | 101203543 B | 2/2012 |

(Continued)

OTHER PUBLICATIONS

CN103468196A2 machine translaton (Year: 2013).*
Notification of Transmittal of the International Search Report and the Written Opinion of the International Searching Authority, or the Declaration date of mailing Feb. 25, 2020 received in International Application No. PCT/CN2019/123683.
Notification of Transmittal of the International Search Report and the Written Opinion of the International Searching Authority, or the Declaration date of mailing Feb. 25, 2020 received in International Application No. PCT/CN2019/123685.

(Continued)

*Primary Examiner* — Terressa Boykin
(74) *Attorney, Agent, or Firm* — Judith C. Rawls

(57) ABSTRACT

Adhesive compositions comprising a polyester polyol that includes residues of at least one 2,2,4,4-tetraalkylcyclobutane-1,3-diol, including, for example, 2,2,4,4-tetramethylcyclobutane-1,3-diol (TMCD). Adhesive compositions may exhibit enhanced properties as compared to conventional adhesive compositions, and may be suitable for a wide variety of end use applications, including, flexible packaging, woodworking, automotive uses, and electronics.

20 Claims, No Drawings

(56) References Cited

U.S. PATENT DOCUMENTS

| | | |
|---|---|---|
| 5,705,575 A | 1/1998 | Kelsey |
| 5,840,827 A | 11/1998 | Zupancic et al. |
| 6,162,891 A | 12/2000 | Wamprecht et al. |
| 6,184,332 B1 | 2/2001 | Dos Santos |
| 6,194,523 B1 | 2/2001 | Murata et al. |
| 6,221,978 B1 | 4/2001 | Li et al. |
| 6,423,816 B1 | 7/2002 | Wamprecht et al. |
| 6,762,276 B2 | 7/2004 | Sumner, Jr. et al. |
| 6,916,547 B2 | 7/2005 | Tian et al. |
| 7,005,002 B2 | 2/2006 | Glöckner et al. |
| 7,317,069 B2 | 1/2008 | Aoshima et al. |
| 7,582,690 B2 | 9/2009 | Pearson, Jr. et al. |
| 7,625,963 B2 | 12/2009 | Wang et al. |
| 7,737,246 B2 | 6/2010 | Crawford |
| 7,772,362 B2 | 8/2010 | Beall et al. |
| 7,838,596 B2 | 11/2010 | Colhoun et al. |
| 7,955,674 B2 | 6/2011 | Hale et al. |
| 7,960,472 B2 | 6/2011 | Colhoun et al. |
| 7,968,164 B2 | 6/2011 | Hale et al. |
| 7,985,827 B2 | 7/2011 | Crawford et al. |
| 7,989,555 B2 | 8/2011 | Kodali |
| 8,063,173 B2 | 11/2011 | Crawford et al. |
| 8,163,850 B2 | 4/2012 | Marsh et al. |
| 8,168,721 B2 | 5/2012 | Marsh et al. |
| 8,193,302 B2 | 6/2012 | Germroth et al. |
| 8,247,514 B2 | 8/2012 | Griswold |
| 8,263,728 B2 | 9/2012 | Kono et al. |
| 8,304,499 B2 | 11/2012 | Shelby et al. |
| 8,324,316 B2 | 12/2012 | Powell et al. |
| 8,389,117 B2 | 3/2013 | Shelby et al. |
| 8,389,647 B2 | 3/2013 | Paschkowski |
| 8,415,450 B2 | 4/2013 | Crawford et al. |
| 8,431,232 B2 | 4/2013 | Shelby et al. |
| 8,519,055 B2 | 8/2013 | Marsh et al. |
| 8,524,834 B2 | 9/2013 | Marsh et al. |
| 8,580,872 B2 | 11/2013 | Kuo et al. |
| 8,586,701 B2 | 11/2013 | Barton et al. |
| 8,614,280 B2 | 12/2013 | Witt et al. |
| 8,796,395 B2 | 8/2014 | Jenkins et al. |
| 8,969,489 B2 | 3/2015 | Zhou et al. |
| 8,980,389 B2 | 3/2015 | Pecorini et al. |
| 9,029,461 B2 | 5/2015 | Marsh et al. |
| 9,040,639 B2 | 5/2015 | Witt et al. |
| 9,062,197 B2 | 6/2015 | Treece et al. |
| 9,145,470 B2 | 9/2015 | Alidedeoglu et al. |
| 9,156,941 B2 | 10/2015 | Jenkins et al. |
| 9,169,388 B2 | 10/2015 | Germroth et al. |
| 9,181,387 B2 | 11/2015 | Crawford et al. |
| 9,221,945 B2 | 12/2015 | Alzer et al. |
| 9,376,530 B2 | 6/2016 | Hess et al. |
| 9,399,715 B2 | 7/2016 | Stockl et al. |
| 9,487,619 B2 | 11/2016 | Kuo et al. |
| 9,534,079 B2 | 1/2017 | Crawford et al. |
| 9,598,602 B2 | 3/2017 | Kuo et al. |
| 9,650,539 B2 | 5/2017 | Kuo et al. |
| 9,676,976 B2 | 6/2017 | Takeda et al. |
| 9,765,203 B2 | 9/2017 | Germroth et al. |
| 9,828,522 B2 | 11/2017 | Argyropoulos et al. |
| 9,840,584 B2 | 12/2017 | Mukerjee et al. |
| 9,988,553 B2 | 6/2018 | Dziczkowski et al. |
| 10,011,737 B2 | 7/2018 | Zhou et al. |
| 10,040,899 B2 | 8/2018 | Tabor et al. |
| 10,190,029 B2 | 1/2019 | Franken et al. |
| 10,336,925 B2 | 7/2019 | Bae et al. |
| 10,344,121 B2 | 7/2019 | Mukerjee et al. |
| 10,526,444 B2 | 1/2020 | Inglefield, Jr. et al. |
| 10,676,565 B2 | 6/2020 | Zhou et al. |
| 10,934,390 B2 | 3/2021 | Tabor et al. |
| 2004/0072952 A1 | 4/2004 | Hung et al. |
| 2005/0033004 A1 | 2/2005 | Hoffmann et al. |
| 2005/0222363 A1 | 10/2005 | Krebs et al. |
| 2006/0079650 A1 | 4/2006 | Stevenson et al. |
| 2007/0027272 A1 | 2/2007 | Zhang et al. |
| 2008/0292902 A1 | 11/2008 | Reid |
| 2010/0159176 A1 | 6/2010 | Hale et al. |
| 2010/0204388 A1 | 8/2010 | Marsh et al. |
| 2010/0204392 A1 | 8/2010 | Marsh et al. |
| 2010/0204401 A1 | 8/2010 | Marsh et al. |
| 2012/0172520 A1 | 7/2012 | Marsh et al. |
| 2012/0202920 A1* | 8/2012 | Marsh ............... C09D 133/08 |
| | | 523/400 |
| 2013/0023604 A1 | 1/2013 | Kuo et al. |
| 2013/0072628 A1 | 3/2013 | Crawford et al. |
| 2013/0206756 A1 | 8/2013 | Niederst et al. |
| 2013/0280455 A1 | 10/2013 | Evans et al. |
| 2013/0296488 A1 | 11/2013 | Marsh et al. |
| 2014/0113094 A1* | 4/2014 | Pearcy ............... C08G 63/85 |
| | | 528/308.1 |
| 2014/0131353 A1 | 5/2014 | Knotts et al. |
| 2014/0296407 A1 | 10/2014 | Marsh et al. |
| 2015/0259468 A1 | 9/2015 | Beall et al. |
| 2016/0040050 A1 | 2/2016 | Munoz et al. |
| 2016/0115274 A1 | 4/2016 | Kuo et al. |
| 2016/0115345 A1 | 4/2016 | Kuo et al. |
| 2016/0115347 A1 | 4/2016 | Kuo et al. |
| 2016/0137877 A1 | 5/2016 | Kuo et al. |
| 2016/0297994 A1 | 10/2016 | Kuo et al. |
| 2016/0326408 A1 | 11/2016 | Suen et al. |
| 2016/0340471 A1 | 11/2016 | Zhou et al. |
| 2017/0066950 A1 | 3/2017 | Bae et al. |
| 2017/0101502 A1 | 4/2017 | Webster, Jr. et al. |
| 2018/0066106 A1 | 3/2018 | Mukerjee et al. |
| 2018/0223126 A1 | 8/2018 | Beccaria et al. |
| 2018/0237671 A1 | 8/2018 | Das et al. |
| 2018/0298254 A1 | 10/2018 | Matsuda et al. |
| 2018/0320037 A1 | 11/2018 | Franken et al. |
| 2018/0355105 A1 | 12/2018 | Kuo et al. |
| 2018/0355145 A1 | 12/2018 | Kuo et al. |
| 2019/0211147 A1 | 7/2019 | Crawford et al. |
| 2019/0264078 A1 | 8/2019 | Xie et al. |
| 2020/0040132 A1 | 2/2020 | Hwang et al. |
| 2020/0165379 A1 | 5/2020 | Crawford et al. |
| 2020/0263027 A1 | 8/2020 | Cable et al. |
| 2020/0362101 A1 | 11/2020 | Lehenmeier et al. |
| 2020/0362103 A1 | 11/2020 | Lehenmeier et al. |
| 2021/0332184 A1 | 10/2021 | Li et al. |
| 2021/0332276 A1 | 10/2021 | Keng et al. |
| 2022/0025231 A1 | 1/2022 | Keng et al. |

FOREIGN PATENT DOCUMENTS

| | | |
|---|---|---|
| CN | 101679619 B | 4/2012 |
| CN | 101193935 B | 1/2013 |
| CN | 101296992 B | 8/2013 |
| CN | 10346819 A | 12/2013 |
| CN | 103468196 A2 * | 12/2013 |
| CN | 104017531 A | 9/2014 |
| CN | 104861916 A | 8/2015 |
| CN | 102449064 B | 3/2016 |
| CN | 104736600 B | 12/2016 |
| CN | 107532058 A | 1/2018 |
| CN | 108026256 A | 5/2018 |
| CN | 108495879 A | 9/2018 |
| CN | 109563252 A | 4/2019 |
| CN | 110114433 A | 8/2019 |
| CN | 107531889 B | 7/2020 |
| CN | 110041514 B | 5/2021 |
| CN | 107531926 B | 7/2021 |
| CN | 108752573 B | 10/2021 |
| CN | 109563247 B | 10/2021 |
| EP | 2152777 B1 | 6/2014 |
| EP | 2749621 B1 | 2/2018 |
| EP | 2274356 B1 | 1/2019 |
| JP | 2000319363 A | 11/2000 |
| JP | 6573146 B2 | 9/2019 |
| WO | WO 1995 001406 A1 | 1/1995 |
| WO | WO 2007 137116 A2 | 11/2007 |
| WO | WO 2010 090715 A1 | 8/2010 |
| WO | WO 2013 169459 A1 | 11/2013 |
| WO | WO 2016 069622 A1 | 5/2016 |
| WO | WO 2017 066142 A1 | 4/2017 |
| WO | WO 2017/121540 A1 | 7/2017 |

(56) References Cited

FOREIGN PATENT DOCUMENTS

WO     WO 2019 018340 A1     1/2019
WO     WO 2019 100058 A1     5/2019

OTHER PUBLICATIONS

Notification of Transmittal of the International Search Report and the Written Opinion of the International Searching Authority, or the Declaration date of mailing Feb. 26, 2020 received in International Application No. PCT/CN2019/123674.
Notification of Transmittal of the International Search Report and the Written Opinion of the International Searching Authority, or the Declaration date of mailing Mar. 11, 2020 received in International Application No. PCT/CN2019/123677.
Co-pending U.S. Appl. No. 17/309,560, filed Jun. 4, 2021; Li et al.
Co-pending U.S. Appl. No. 17/309,561, filed Jun. 4, 2021; Feng et al.
Co-pending U.S. Appl. No. 17/309,562, filed Jun. 4, 2021; Feng et al.
Eastman Chemical Company, "Unsaturated Polyester Resin Compositions Comprising Residues of Aromatic Diacid, Aliphatic Diol, and Cycloaliphatic Diol Compounds and Articles Made Therefrom Exhibiting Corrosion, Chemical and Heat Resistance" IP.com Publication No. IPCOM000193292D, published Feb. 17, 2010.
Eastman Chemical Company, "Use of 2,2,4,4,-Tetramethyl-1,3-cyclobutanediol (TMCD) in Coating and Thermoplastic Applications" IP.com Publication No. IPCOM000227755D, published May 14, 2013.
Eastman Chemical Company, "Utility of 2,2,4,4,-Tetramethyl-1,3-cyclobutanediol (TMCD) in Coating Applications" IP.com Publication No. IPCOM000198694D, published Aug. 12, 2010.
Eastman Chemical Company and National Institute of Standards and Technology (NIST); "Weathering Performance of TMCD Polyester Polyols in Automotive Coating Application"; 2016 FOCUS Conference; May 5, 2016.
Feng, Linqian et al.; "Effect of TMCD Polyester Polyols on Weathering Performance of Automotive Coatings"; American Coatings (Full Paper); Jan. 26, 2016, 5 pages.
Marsh, Stacey J. and Beccaria, Damiano; "Novel Industrial Coatings Using TMCD"; European Coatings Congress (Full Paper); Apr. 21, 2015, 2 pages.
Marsh, Stacey J.; "Raising Polyester Performance with TMCD Glycol"; Proceedings of the International Waterborne, High-Solids, and Powder Coatings Symposium; Mar. 1-4, 2011; 14 pages.
USPTO Office Action received in U.S. Appl. No. 17/309,560 dated Jun. 28, 2023 (Published 2021/033218).
USPTO Office Action received in U.S. Appl. No. 17/309,561 dated Dec. 13, 2023.
Ni, Hai et al.; "Cycloaliphatic polyester-based high-solids polyurethane coatings II. The effect of difunctional acid"; Progress in Organic Coatings 45 (2002) 49-58.
"A statistical comparison of Eastman 1,4-CHDA, Eastman PIA, AD, and HHPA in a high-solids resin system based on Eastman TMPD glycol"; N-335C Technical Publication, Feb. 2013.
Soucek, Mark D., et al.; "Effect of Additional Hydroxyl Functionalities on the Hydrolytic Stability of Oligoesters"; Macromolecular Chemistry and Physics, (2004), 205, pp. 35-41.

* cited by examiner

US 12,037,521 B2

ADHESIVE COMPOSITIONS WITH POLYESTERS COMPRISING 2,2,4,4-TETRAALKYL-1,3-CYCLOBUTANEDIOL AND METHODS OF MAKING THE SAME

CROSS-REFERENCE TO RELATED APPLICATION(S)

This application is a national stage filing under 35 USC § 371 of International Application Number PCT/CN2019/123685, filed on Dec. 6, 2019, which claims the benefit of the filing date to U.S. Provisional Application No. 62/776,179, filed on Dec. 6, 2018, the entire disclosures of which are incorporated by reference herein.

FIELD OF THE INVENTION

This invention relates to polyurethane adhesives based on polyesters containing residues of a 2,2,4,4-tetraalkyl-1,3-cyclobutanediol (TACD), and, in particular, residues of 2,2,4,4-tetramethylcyclobutane-1,3-diol (TMCD).

BACKGROUND

Polyurethanes are widely used as adhesives and sealants to bond a variety of substrates. Depending on the applications, polyurethane adhesives and sealants can be formulated to provide various desirable properties. However, unmet needs still exist for various applications. For example, improved weatherability can be desirable for outdoor applications, for example, in building and construction, and in exterior applications in automotive and aircraft uses. Thermal stability is one property desirable for auto interior applications. Hydrolytic stability and chemical resistance can be desirable for packaging and electronic applications. Impact resistance can be desirable for auto windshield mounting. Reduced viscosity can be desirable for ease of applying hot melt adhesives. Reduced volatile organic compounds (VOC) can be advantageous for laminating adhesives. Also, a need in the assembly of parts for consumer electronics is increasingly influenced by the miniaturization of electronic devices where new materials are desirable. In addition, as the global manufacturing industry is transitioning to the use of more lightweight materials, there is a greater demand for non-traditional materials. Lightweight materials, such as composites, aluminum and other metal alloys cannot be fastened in the same way as traditional metals. The methods of joining different materials together is transitioning from mechanical fasteners like screws, bolts and welds to adhesives and joints.

Thus, there is a need for polyurethane adhesives/sealants that have improved properties for certain end-use applications, such as, for example, adequate cure time, green bond strength, solvent resistance, chemical resistance, hydrolytic stability, thermal stability, impact resistance, weatherability, improved applicability, and reduced volatile organic compounds (VOC).

SUMMARY

In one aspect, the present invention concerns a polyester polyol suitable for use in adhesive compositions, the polyester polyol comprising: (a) an acid component comprising residues of at least one dicarboxyl monomer; and (b) a diol component comprising residues of (i) a 2,2,4,4-tetraalkyl-1,3-cyclobutanediol (TACD); and (ii) at least one diol or polyol other than the TACD, wherein the polyester polyol has a hydroxyl functionality of less than 2.1 and a glass transition temperature (Tg) in the range of from about −30° C. to less than 55° C.

In one aspect, the present invention concerns a polyester polyol suitable for use in adhesive compositions, the polyester polyol comprising: an acid component comprising residues of at least two dicarboxyl monomers, wherein each of the dicarboxyl monomers are present in the acid component in an amount of greater than about 5 mole percent, based on the total moles of the acid component; and a diol component comprising residues of a 2,2,4,4-tetraalkyl-1,3-cyclobutanediol (TACD); wherein the polyester polyol has a hydroxyl functionality of less than 2.1 and at least one of the following properties (A) and (B): (A) a glass transition temperature (Tg) in the range of from −30 to 120° C.; and (B) a number average molecular weight (Mn) in the range of from 500 to 10,000 g/mole.

In one aspect, the present invention concerns a method of making a polyester polyol suitable for use in an adhesive composition, the method comprising reacting at least two dicarboxyl monomers with a 2,2,4,4-tetraalkyl-1,3-cyclobutanediol (TACD) to form a polyester polyol, wherein the polyester polyol has a hydroxyl functionality of less than 2.1 and at least one of the following properties (A) and (B): (A) a glass transition temperature (Tg) in the range of from −30 to 120° C.; and (B) a number average molecular weight (Mn) in the range of from 500 to 10,000 g/mole, wherein the polyester polyol has an acid component comprising greater than 5 mole percent of each of residues of each of the dicarboxyl monomers, based on the total moles of the acid component.

In one aspect the present invention concerns, an adhesive composition comprising (a) a polyester polyol comprising a diol component having residues of 2,2,4,4-tetraalkyl-1,3-butanediol (TACD); and (b) at least one isocyanate, wherein the adhesive composition exhibits at least one of the following properties (i) through (v): (i) an offline bond strength of 100 to 1000 g/in; (ii) 24-hour bond strength of 200 to 3000 g/in; (iii) chemical resistance of 200 to 1000 g/in after boil in bag with 1:1:1 food simulant; (iv) thermal resistance of 200 to 800 g/in at 90° C.; and (v) time to achieve substrate failure of ≤24 hours.

In one aspect, the present invention concerns an adhesive composition comprising a prepolymer having an isocyanate functionality comprising the reaction product of (i) a polyester polyol comprising the residues of (A) 2,2,4,4-tetraalkylcyclobutane-1,3-diol in an amount of about 5 to about 95 mole %, based on the total moles of the diols, (B) at least one diol other than 2,2,4,4-tetraalkylcyclobutane-1,3-diol in an amount of about 5 to 95 mole % based on the total moles of the diols, (A) and (B) equaling 100 mole %, and (C) a dicarboxyl compound, and (ii) a difunctional isocyanate, and (b) water or a compound having one or more functional groups selected from hydroxyl, amino, ketoacetate, and carbamate, wherein said adhesive composition exhibits at least one of the following properties (i) through (v)-(i) an offline bond strength of 100 to 1000 g/in; (ii) 24-hour bond strength of 200 to 3000 g/in; (iii) chemical resistance of 200 to 1000 g/in after boil in bag with 1:1:1 food simulant; (iv) thermal resistance of 200 to 800 g/in at 90° C.; and (v) time to achieve substrate failure of ≤24 hours.

In one aspect, the present invention concerns a laminated article comprising: a first layer presenting a first surface; a second layer presenting a second surface; and an adhesive layer disposed between and at least partially in contact with at least one of the first and the second surfaces, wherein the adhesive layer is formed from an adhesive composition comprising a polyurethane polymer or prepolymer comprising (i) residues of a polyester polyol having a diol component having residues of 2,2,4,4-tetraalkyl-1,3-butanediol (TACD); and (ii) residues of at least one isocyanate.

In one aspect, the present invention concerns a method of making an adhesive composition, the method comprising: combining (a) a polyester polyol comprising a diol component having residues of 2,2,4,4-tetraalkyl-1,3-butanediol (TACD); and (b) at least one isocyanate to form an adhesive composition, wherein the adhesive composition exhibits at least one of the following properties (i) through (v): (i) an offline bond strength of 100 to 1000 g/in; (ii) 24-hour bond strength of 200 to 3000 g/in; (iii) chemical resistance of 200 to 1000 g/in after boil in bag with 1:1:1 food simulant; (iv) thermal resistance of 200 to 800 g/in at 90° C.; and (v) time to achieve substrate failure of ≤24 hours.

In one aspect, the present invention concerns a method for making a laminated article, the method comprising: providing a first layer presenting a first surface; applying an adhesive composition to at least a portion of the first surface; contacting a second surface of a second layer with at least a portion of the adhesive composition; and adhering the first layer to the second layer via an adhesive layer formed by the adhesive composition to form a laminated article, wherein the adhesive layer comprises a polyester polyol comprising residues of (i) a polyester polyol comprising a diol component having residues of 2,2,4,4-tetraalkyl-1,3-butanediol (TACD); and (ii) at least one isocyanate.

In another aspect, the present invention concerns a hot melt adhesive composition, the adhesive composition comprising: an isocyanate-terminated polyurethane prepolymer comprising residues of (i) at least one polyester polyol comprising a diol component having residues of 2,2,4,4-tetraalkyl-1,3-cyclobutanediol (TACD) and (ii) at least one isocyanate, wherein the adhesive composition has a solids content of at least 95 percent, based on the total weight of the composition.

In one aspect, the present invention concerns a hot melt adhesive composition, the adhesive composition comprising: a polyurethane prepolymer comprising residues of (i) at least one polyester polyol comprising a diol component having residues of 2,2,4,4-tetraalkyl-1,3-cyclobutanediol (TACD) and (ii) at least one isocyanate, wherein at least one property of the adhesive selected from the group consisting of green strength, heat resistance, and hydrolytic stability is at least 5 percent higher than the same property exhibited by an identical adhesive composition formed with a polyurethane prepolymer having an identical composition as the polyurethane prepolymer, but having residues of a comparative polyester polyol instead of said polyester polyol, wherein said comparative polyester polyol has an acid component comprising 50 mole % terephthalic acid (TPA) and 50 mole % isophthalic acid (IPA) and a diol component comprising 52 mole % neopentyl glycol (NPG) and 48 mole % ethylene glycol with a hydroxyl number of 45 mg KOH/g, a glass transition temperature of 50° C., and a melt viscosity of 130° C. at 60 Pa·s, all other components being the same.

In one aspect, the present invention concerns a method of using an adhesive composition, the method comprising: (a) applying an adhesive composition to a first surface of a first substrate to form an adhesive layer, wherein the adhesive composition comprises a polyurethane prepolymer having residues of (i) a polyester polyol comprising residues of 2,2,4,4-tetraalkyl-1,3-cyclobutanediol (TACD) and (ii) at least one isocyanate; (b) contacting at least a portion of the adhesive layer with a second surface of a second substrate; and (c) adhering the first substrate and the second substrate to one another via the adhesive layer thereby forming a layered article.

DETAILED DESCRIPTION

The present invention may be understood more readily by reference to the following detailed description of certain embodiments of the invention and the working examples.

Adhesive compositions described herein may exhibit unique and desirable properties such as, for example, improved cure time, green bond strength, solvent resistance, chemical resistance, hydrolytic stability, thermal stability, impact resistance, weatherability, improved applicability, and reduced VOC, as compared to conventional adhesive compositions. Such compositions may include polyester polyols comprising residues of at least one 2,2,4,4-tetraalkyl-1,3-cyclobutanediol (TACD), which may itself have unexpected properties capable of imparting enhanced functionality or performance to the adhesive composition. Such adhesive compositions as described herein may be of several types and may be suitable for a wide array of end uses, such as, for example, flexible packaging, automotive, building and construction, wood working, assembly of electronic components, and potting for electronics.

Polyester polyols include an acid component and a diol component. In some embodiments, the diol component may comprise residues of 2,2,4,4-tetraalkylcyclobutane-1,3-diol (TACD). TACD is a diol and can be represented by the general structure:

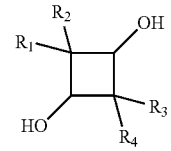

wherein $R_1$, $R_2$, $R_3$, and $R_4$ each independently represent an alkyl radical, for example, a lower alkyl radical having 1 to 8 carbon atoms, or 1 to 6 carbon atoms, or 1 to 5 carbon atoms, or 1 to 4 carbon atoms, or 1 to 3 carbon atoms, or 1 to 2 carbon atoms, or 1 carbon atom. The alkyl radicals may be linear, branched, or a combination of linear and branched alkyl radicals. Examples of TACDs include 2,2,4,4-tetramethylcyclobutane-1,3-diol (TMCD), 2,2,4,4-tetraethylcyclobutane-1,3-diol, 2,2,4,4-tetra-n-propylcyclobutane-1,3-diol, 2,2,4,4-tetra-n-butylcyclobutane-1,3-diol, 2,2,4,4-tetra-n-pentylcyclobutane-1,3-diol, 2,2,4,4-tetra-n-hexylcyclobutane-1,3-diol, 2,2,4,4-tetra-n-heptylcyclobutane-1,3-diol, 2,2,4,4-tetra-n-octylcyclobutane-1,3-diol, 2,2-dimethyl-4,4-diethylcyclobutane-1,3-diol, 2-ethyl-2,4,4-trimethylcyclobutane-1,3-diol, 2,4-dimethyl-2,4-diethylcyclobutane-1,3-diol, 2,4-dimethyl-2,4-di-n-propylcyclobutane-1,3-diol, 2,4-n-dibutyl-2,4-diethylcyclobutane-1,3-diol, 2,4-dimethyl-2,4-diisobutylcyclobutane-1,3-diol, and 2,4-diethyl-2,4-diisoamylcyclobutane-1,3-diol. In some embodiments, TACD may comprise or be TMCD.

The TACD residues may be present in the diol component of the polyester polyol in an amount of at least 2 mole %, 3 mole %, 5 mole %, 10 mole %, 15 mole %, 20 mole %, 25 mole %, 30 mole %, 35 mole %, 40 mole %, 45 mole %, 50 mole %, 55 mole %, 60 mole %, 65 mole %, 70 mole %, 75 mole %, 80 mole %, 85 mole %, 90 mole %, or 95 mole % based on the total residues of the diol component. Additionally, or in the alternative, the diol component of the polyester polyol may comprise not more than 99 mole %, 97 mole %, 95 mole %, 90 mole %, 85 mole %, 80 mole %, 75 mole %, 70 mole %, 65 mole %, 60 mole %, 55 mole %, 50 mole %, 45 mole %, 40 mole %, 35 mole %, 30 mole %, 25 mole %, 20 mole %, 15 mole %, or 10 mole % of TACD residues, based on the total moles of the diol component.

In one embodiment, the diol component of the polyester polyol may comprise TACD residues in an amount of about 5 to about 95 mole % or an amount of about 15 to about 60 mole %, based on the total moles of the diols and the polyol equaling 100 mole % (based on the total moles of the diol component).

In some embodiments, TACD residues can be present in the diol component of the polyester polyol in one of the following amounts: 5 to 95 mole %; 5 to 90 mole %; 5 to 85 mole %; 5 to 80 mole %; 5 to 75 mole %; 5 to 70 mole %; 5 to 65 mole %; 5 to 60 mole %; 5 to 55 mole %; 5 to 50 mole %; 5 to 45 mole %; 5 to 40 mole %; 5 to 35 mole %; 5 to 30 mole %; 5 to 25 mole %; 5 to 20 mole %; 5 to 15 mole %; 10 to 95 mole %; 10 to 90 mole %; 10 to 85 mole %; 10 to 80 mole %; 10 to 75 mole %; 10 to 70 mole %; 10 to 65 mole %; 10 to 60 mole %; 10 to 55 mole %; 10 to 50 mole %; 10 to 45 mole %; 10 to 40 mole %; 10 to 35 mole %; 10 to 30 mole %; 10 to 25 mole %; 10 to 20 mole %; 15 to 95 mole %; 15 to 90 mole %; 15 to 85 mole %; 15 to 80 mole %; 15 to 75 mole %; 15 to 70 mole %; 15 to 65 mole %; 15 to 60 mole %; 15 to 55 mole %; 15 to 50 mole %; 15 to 45 mole %; 15 to 40 mole %; 15 to 35 mole %; 15 to 30 mole %; 15 to 25 mole %; 20 to 95 mole %; 20 to 90 mole %; 20 to 85 mole %; 20 to 80 mole %; 20 to 75 mole %; 20 to 70 mole %; 20 to 65 mole %; 20 to 60 mole %; 20 to 55 mole %; 20 to 50 mole %; 20 to 45 mole %; 20 to 40 mole %; 20 to 35 mole %; 20 to 30 mole %, based on the total moles of the diol component.

In some embodiments, TACD residues can be present in the diol component of the polyester polyol in one of the following amounts: 25 to 95 mole %; 25 to 90 mole %; 25 to 85 mole %; 25 to 80 mole %; 25 to 75 mole %; 25 to 70 mole %; 25 to 65 mole %; 25 to 60 mole %; 25 to 55 mole %; 25 to 50 mole %; 25 to 45 mole %; 25 to 40 mole %; 25 to 35 mole %; 30 to 95 mole %; 30 to 90 mole %; 30 to 85 mole %; 30 to 80 mole %; 30 to 75 mole %; 30 to 70 mole %; 30 to 65 mole %; 30 to 60 mole %; 30 to 55 mole %; 30 to 50 mole %; 30 to 45 mole %; 30 to 40 mole %; 35 to 95 mole %; 35 to 90 mole %; 35 to 85 mole %; 35 to 80 mole %; 35 to 75 mole %; 35 to 70 mole %; 35 to 65 mole %; 35 to 60 mole %; 35 to 55 mole %; 35 to 50 mole %; 35 to 45 mole %, based on the total moles of the diol component.

In some embodiments, TACD residues can be present in one of the following amounts: 40 to 95 mole %; 40 to 90 mole %; 40 to 85 mole %; 40 to 80 mole %; 40 to 75 mole %; 40 to 70 mole %; 40 to 65 mole %; 40 to 60 mole %; 40 to 55 mole %; 40 to 50 mole %; 45 to 95 mole %; 45 to 90 mole %; 45 to 85 mole %; 45 to 80 mole %; 45 to 75 mole %; 45 to 70 mole %; 45 to 65 mole %; 45 to 60 mole %; 45 to 55 mole %; 50 to 95 mole %; 50 to 90 mole %; 50 to 85 mole %; 50 to 80 mole %; 50 to 75 mole %; 50 to 70 mole %; 50 to 65 mole %; 50 to 60 mole %, based on the total moles of the diol component.

In some embodiments, the diol component of the polyester polyol can comprise residues of at least one diol other than the TACD diol. Such diols comprise two hydroxyl groups per molecule, and can be branched or linear, saturated or unsaturated, aliphatic or cycloaliphatic $C_2$-$C_{20}$ compounds. The hydroxyl groups on these diols may be primary, secondary, and/or tertiary and, in some embodiments, may be primary diols.

Examples of diols other than TACD suitable for inclusion in the polyester polyol include 2,2-dimethyl-1,3-propanediol (neopentyl glycol), 1,2-cyclohexanedimethanol, 1,3-cyclohexanedimethanol, 1,4-cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 2-ethyl-2-isobutyl-1,3-propanediol, 1,3-butanediol, 1,4-butanediol, 1,5-pentanediol, 1,6-hexanediol, 2,2,4,4-tetramethyl-1,6-hexanediol, 1,10-decanediol, 1,4-benzenedimethanol, ethylene glycol, 1-3-propylene glycol, 1-4-propylene glycol, diethylene glycol, dipropylene glycol, triethylene glycol, tetraethylene glycol, polyethylene glycol, pentanediol, dodecandiol, and 2,2-bis(hydroxymethyl)propionic acid (dimethylolpropionic acid).

In some embodiments, the diol other than TACD may be selected from 2,2-dimethyl-1,3-propanediol (neopentyl glycol), 1,2-cyclohexanedimethanol, 1,3-cyclohexanedimethanol, 1,4-cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 1,4-butanediol, 1,3-propanediol, 1,2-propanediol, ethylene glycol, diethylene glycol, and 1,6-hexanediol or mixtures thereof. The diol other than TACD may also be selected from the group consisting of diethylene glycol, 1,4-butanediol, 1,6-hexanediol, pentanediol, dodecandiol, and combinations thereof. Alternatively, or in addition, the diol other than TACD may be selected from the group consisting of diethylene glycol, 1,4-cyclohexanedimethanol, neopentyl glycol, and combinations thereof.

In some embodiments, the diol component of the polyester polyol can comprise residues of a diol other than TACD in an amount of at least about 3 mole %, at least about 5 mole %, at least about 10 mole %, at least about 15 mole %, at least about 20 mole %, at least about 25 mole %, at least about 30 mole %, at least about 35 mole %, at least about 40 mole %, at least about 45 mole %, at least about 50 mole %, at least about 55 mole %, at least about 60 mole %, at least about 65 mole %, at least about 70 mole %, or at least about 75 mole % and/or not more than about 95 mole %, not more than about 90 mole %, not more than about 85 mole %, not more than about 80 mole %, not more than about 75 mole %, not more than about 70 mole %, not more than about 65 mole %, not more than about 60 mole %, not more than about 55 mole %, not more than about 50 mole %, not more than about 45 mole %, or not more than about 40 mole %, based on the total moles of the diol component.

In some embodiments, residues of a diol other than TACD can be present in the diol component of the polyester polyol in one of the following amounts: 40 to 95 mole %; 40 to 90 mole %; 40 to 85 mole %; 40 to 80 mole %; 40 to 75 mole %; 40 to 70 mole %; 40 to 65 mole %; 40 to 60 mole %; 40 to 55 mole %; 40 to 50 mole %; 45 to 95 mole %; 45 to 90 mole %; 45 to 85 mole %; 45 to 80 mole %; 45 to 75 mole %; 45 to 70 mole %; 45 to 65 mole %; 45 to 60 mole %; 45 to 55 mole %; 50 to 95 mole %; 50 to 90 mole %; 50 to 85 mole %; 50 to 80 mole %; 50 to 75 mole %; 50 to 70 mole %; 50 to 65 mole %; 50 to 60 mole %; 55 to 95 mole %; 55 to 90 mole %; 55 to 85 mole %; 55 to 80 mole %; 55 to 75 mole %; 55 to 70 mole %; 55 to 65 mole %; 60 to 95 mole %; 60 to 90 mole %; 60 to 85 mole %; 60 to 80 mole %; 60 to 75 mole %; 60 to 70 mole %; 65 to 95 mole %; 65 to 90 mole %; 65 to 85 mole %; 65 to 80 mole %; 65 to 75 mole %; 70 to 95 mole %; 70 to 90 mole %; 70 to 85 mole %; 70 to 80 mole %; 75 to 95 mole %; 75 to 90 mole %; 75 to 85 mole %; 80 to 95 mole %; 80 to 90 mole %, based on the total moles of the diol component.

In some embodiments, the diol component of the polyester polyol may comprise the following residues: TACD residues in the amount of 15 to 60 mole % and the residues of at least one diol other than TACD can be present in the amount of 40 to 85%; TACD residues can be present in the amount of 20 to 60 mole % and the residues of at least one diol other than TACD can be present in the amount of 40 to 80%; TACD residues can be present in the amount of 25 to 60 mole % and the residues of at least one diol other than TACD can be present in the amount of 40 to 75%; TACD residues can be present in the amount of 30 to 60 mole % and the residues of at least one diol other than TACD can be present in the amount of 40 to 70%, based on the total moles of the diol component.

In some embodiments, the diol component of the polyester polyol may include one of the following compositions: (1) TACD residues can be present in the amount of 15 to 55 mole % and the residues of at least one diol other than TACD can be present in the amount of 45 to 85%; or (2) TACD residues can be present in the amount of 20 to 55 mole % and the residues of at least one diol other than TACD can be present in the amount of 45 to 80%; or (3) TACD residues can be present in the amount of 25 to 55 mole % and the residues of at least one diol other than TACD can be present in the amount of 45 to 75%; or (4) TACD residues can be present in the amount of 30 to 55 mole % and the residues of at least one diol other than TACD can be present in the amount of 45 to 70%; or (5) TACD residues can be present in the amount of 35 to 55 mole % and the residues of at least one diol other than TACD can be present in the amount of 45 to 65%; or (6) TACD residues can be present in the amount of 40 to 55 mole % and the residues of at least one diol other than TACD can be present in the amount of 45 to 60%, based on the total moles of the diol component.

In some embodiments, the diol component of the polyester polyol may include one of the following compositions: (7) TACD residues can be present in the amount of 15 to 50 mole % and the residues of at least one diol other than TACD can be present in the amount of 50 to 85 mole %; or (8) TACD residues can be present in the amount of 20 to 50 mole % and the residues of at least one diol other than TACD can be present in the amount of 50 to 80 mole %; or (9) TACD residues can be present in the amount of 25 to 50 mole % and the residues of at least one diol other than TACD can be present in the amount of 50 to 75 mole %; or (10) TACD residues can be present in the amount of 30 to 50 mole % and the residues of at least one diol other than TACD can be present in the amount of 50 to 70 mole %; or (11) TACD residues can be present in the amount of 35 to 50 mole % and the residues of at least one diol other than TACD can be present in the amount of 50 to 65 mole %; or (12) TACD residues can be present in the amount of 40 to 50 mole % and the residues of at least one diol other than TACD can be present in the amount of 50 to 60 mole %, based on the total moles of the diol component.

In some embodiments, the diol component of the polyester polyol may include one of the following compositions: (13) TACD residues can be present in the amount of 15 to 45 mole % and the residues of at least one diol other than TACD can be present in the amount of 55 to 85 mole %; or (14) TACD residues can be present in the amount 20 to 45 mole % and the residues of at least one diol other than TACD can be present in the amount of 55 to 80 mole %; or (15) TACD residues can be present in the amount of 25 to 45 mole % and the residues of at least one diol other than TACD can be present in the amount of 55 to 75 mole %; or (16) TACD residues can be present in the amount of 30 to 45 mole % and the residues of at least one diol other than TACD can be present in the amount of 55 to 70 mole %; or (17) TACD residues can be present in the amount of 35 to 45 mole % and the residues of at least one diol other than TACD can be present in the amount of 55 to 65% mole; or (18) TACD residues can be present in the amount of 40 to 45 mole % and the residues of at least one diol other than TACD can be present in the amount of 55 to 60 mole %, based on the total moles of the diol component.

In some embodiments, the diol component of the polyester polyol may include one of the following compositions: (19) TACD residues can be present in the amount of 15 to 40 mole % and the residues of at least one diol other than TACD can be present in the amount of 60 to 85 mole %; or (20) TACD residues can be present in the amount of 20 to 40 mole % and the residues of at least one diol other than TACD can be present in the amount of 60 to 80 mole %; or (21) TACD residues can be present in the amount of 25 to 40 mole % and the residues of at least one diol other than TACD can be present in the amount of 60 to 75% mole; or (22) TACD residues can be present in the amount of 30 to 40 mole % and the residues of at least one diol other than TACD can be present in the amount of 60 to 70 mole %; or (23) TACD residues can be present in the amount of 35 to 40 mole % and the residues of at least one diol other than TACD can be present in the amount of 60 to 65 mole %, based on the total moles of the diol component.

In some embodiments, the diol component of the polyester polyol may include one of the following compositions: (24) TACD residues can be present in the amount of 15 to 35 mole % and the residues of at least one diol other than TACD can be present in the amount of 65 to 85 mole %; or (25) TACD residues can be present in the amount of 20 to 35 mole % and the residues of at least one diol other than TACD can be present in the amount of 65 to 80 mole %; or (26) TACD residues can be present in the amount of 25 to 35 mole % and the residues of at least one diol other than TACD can be present in the amount of 65 to 75 mole %; or (27) TACD residues can be present in the amount of 30 to 35 mole % and the residues of at least one diol other than TACD can be present in the amount of 65 to 70 mole %, based on the total moles of the diol component.

In some embodiments, the diol component of the polyester polyol may include one of the following compositions: (28) TACD residues can be present in the amount of 15 to 30 mole % and the residues of at least one diol other than TACD can be present in the amount of 70 to 85 mole %; or (29) TACD residues can be present in the amount of 20 to 30 mole % and the residues of at least one diol other than TACD can be present in the amount of 70 to 80 mole %; or (30) TACD residues can be present in the amount of 25 to 30 mole % and the residues of at least one diol other than TACD can be present in the amount of 70 to 75 mole %, based on the total moles of the diol component.

In some embodiments, the diol component of the polyester polyol may include one of the following compositions: (31) TACD residues can be present in the amount of 15 to 25 mole % and the residues of at least one diol other than TACD can be present in the amount of 75 to 85 mole %; or (32) TACD residues can be present in the amount of 20 to 25 mole % and the residues of at least one diol other than TACD can be present in the amount of 75 to 80 mole %, based on the total moles of the diol component.

According to some embodiments, the diol component of the polyester polyol may comprise not more than 25 mole % of one or more certain types of diols. For example, in some embodiments, the diol component of the polyester polyol may comprise not more than 20 mole %, not more than about 15 mole %, not more than about 10 mole %, not more than about 8 mole %, not more than about 5 mole %, not more than about 3 mole %, not more than about 2 mole %, not more than about 1 mole %, or not more than about 0.5 mole % of aromatic diols, based on the total moles of the diol component. In some embodiments, the diol component of the polyester polyol may comprise not more than 20 mole %, not more than about 15 mole %, not more than about 10 mole %, not more than about 8 mole %, not more than about 5 mole %, not more than about 3 mole %, not more than about 2 mole %, not more than about 1 mole %, or not more than about 0.5 mole % of ethylene glycol, based on the total moles of the diol component.

In some embodiments, the diol component of the polyester polyol may further comprise residues of at least one polyol. As used herein, the term "polyol" refers to a monomeric compound having at least three hydroxyl groups.

When present, the polyol used to form the polyester polyol described herein can be branched or linear, saturated or unsaturated, aliphatic or cycloaliphatic $C_2$-$C_{20}$ compounds. The hydroxyl groups can be primary, secondary, and/or tertiary, and, in one embodiment, at least two of the hydroxyl groups may be primary. In one embodiment, the polyols may be hydrocarbons and may not contain atoms other than hydrogen, carbon and oxygen. Examples of suitable polyols may include, but are not limited to, 1,1,1-trimethylolpropane (TMP), 1,1,1-trimethylolethane, glycerin, pentaerythritol, erythritol, threitol, dipentaerythritol, sorbitol, mixtures thereof, and the like. In one embodiment, the polyol can comprise TMP.

In some embodiments, the polyester polyol can include a diol component in which a polyol may be present in an amount of 0 to about 60 mole %, about 0 to about 50 mole %, about 0 to about 40 mole %, about 0 to about 30 mole %, about 0 to about 20 mole %, or about 0 to about 15 mole %, based on the total moles of the diol component. In certain embodiments, the polyol may be present in one of the following amounts: 5 to 60 mole %; 5 to 55 mole %; 5 to 50 mole %; 5 to 45 mole %; 5 to 40 mole %; 5 to 35 mole %; 5 to 30 mole %; 5 to 25 mole %; 5 to 20 mole %; 5 to 15 mole %; 10 to 60 mole %; 10 to 55 mole %; 10 to 50 mole %; 10 to 45 mole %; 10 to 40 mole %; 10 to 35 mole %; 10 to 30 mole %; 10 to 25 mole %; 10 to 20 mole %; 15 to 60 mole %; 15 to 55 mole %; 15 to 50 mole %; 15 to 45 mole %; 15 to 40 mole %; 15 to 35 mole %; 15 to 30 mole %; 15 to 25 mole %; 20 to 60 mole %; 20 to 55 mole %; 20 to 50 mole %; 20 to 45 mole %; 20 to 40 mole %; 20 to 35 mole %; 20 to 30 mole %; 25 to 60 mole %; 25 to 55 mole %; 25 to 50 mole %; 25 to 45 mole %; 25 to 40 mole %; 25 to 35 mole %; 30 to 60 mole %; 30 to 55 mole %; 30 to 50 mole %; 30 to 45 mole %; 30 to 40 mole %; 35 to 60 mole %; 35 to 55 mole %; 35 to 50 mole %; 35 to 45 mole; 40 to 60 mole %; 40 to 55 mole %; 40 to 50 mole %; 45 to 60 mole %; 45 to 55 mole %; or 50 to 60 mole %. In one embodiment, the polyol may be present in the amount of 0 to 60 mole %, while, in another embodiment, the polyester polyol may include a diol component in which the in the amount of 5 to 30 mole %, based on the total moles of the diol component.

The polyester polyols described herein also include an acid component comprising residues of at least one dicarboxyl monomer. Dicarboxyl monomers may comprises one or more dicarboxylic acids, derivatives of dicarboxylic acids, or combinations thereof. A dicarboxylic acid may include two carboxylic acid groups, derivatives thereof, or combinations thereof, capable of forming an ester linkage with a hydroxyl component. Examples of derivatives include, but are not limited to, dimethyl ester or other dialkyl esters of a dicarboxylic acid, a diacid chloride or other diacid halide, or a diacid anhydride. Specific types of dicarboxylic acids can include, for example, aliphatic dicarboxylic acids, alicyclic dicarboxylic acids, aromatic dicarboxylic acids, derivatives of each, or mixtures of two or more of these acids.

In some embodiments, the acid component of the polyester polyol may include residues of at least two dicarboxyl monomers. In such cases, the residues of each dicarboxyl monomer may be present in an amount of at least about 3 mole %, at least about 5 mole %, at least about 10 mole %, at least about 15 mole %, at least about 20 mole %, at least about 25 mole %, at least about 30 mole %, at least about 35 mole %, at least about 40 mole %, at least about 45 mole %, at least about 50 mole %, at least about 55 mole %, at least about 60 mole %, at least about 65 mole %, at least about 70 mole %, or at least about 75 mole % and/or not more than about 95 mole %, not more than about 90 mole %, not more than about 85 mole %, not more than about 80 mole %, not more than about 75 mole %, not more than about 70 mole %, not more than about 65 mole %, not more than about 60 mole %, not more than about 55 mole %, not more than about 50 mole %, not more than about 45 mole %, or not more than about 40 mole %, not more than about 35 mole %, not more than about 30 mole %, not more than about 25 mole %, not more than about 20 mole %, or not more than about 15 mole %, based on the total moles of the acid component.

In some embodiments, the acid component may consist of, or consist essentially of, residues of a single type of dicarboxyl monomer. In such embodiments, the acid component may comprise at least about 90 mole %, at least about 92 mole %, at least about 95 mole %, at least about 97 mole %, at least about 99 mole %, or 100 mole % of residues of a certain dicarboxyl monomer. Thus, the acid component may comprise not more than about 10 mole %, not more than about 8 mole %, not more than about 5 mole %, not more than about 3 mole %, or not more than about 1 mole %, or 0 mole % of residues other than residues of a specified dicarboxyl monomer, based on the total residues of the acid component.

In some embodiments, one or both of the dicarboxyl monomers may be present in an amount of 5 to 60 mole %; 5 to 55 mole %; 5 to 50 mole %; 5 to 45 mole %; 5 to 40 mole %; 5 to 35 mole %; 5 to 30 mole %; 5 to 25 mole %; 5 to 20 mole %; 5 to 15 mole %; 10 to 60 mole %; 10 to 55 mole %; 10 to 50 mole %; 10 to 45 mole %; 10 to 40 mole %; 10 to 35 mole %; 10 to 30 mole %; 10 to 25 mole %; 10 to 20 mole %; 15 to 60 mole %; 15 to 55 mole %; 15 to 50 mole %; 15 to 45 mole %; 15 to 40 mole %; 15 to 35 mole %; 15 to 30 mole %; 15 to 25 mole %; 20 to 60 mole %; 20 to 55 mole %; 20 to 50 mole %; 20 to 45 mole %; 20 to 40 mole %; 20 to 35 mole %; 20 to 30 mole %; 25 to 60 mole %; 25 to 55 mole %; 25 to 50 mole %; 25 to 45 mole %; 25 to 40 mole %; 25 to 35 mole %; 30 to 60 mole %; 30 to 55 mole %; 30 to 50 mole %; 30 to 45 mole %; 30 to 40 mole %; 35 to 60 mole %; 35 to 55 mole %; 35 to 50 mole %; 35 to 45 mole; 40 to 60 mole %; 40 to 55 mole %; 40 to 50 mole %; 45 to 60 mole %; 45 to 55 mole %; or 50 to 60 mole %, while the other dicarboxyl monomer may be present in an amount of 40 to 95 mole %; 40 to 90 mole %; 40 to 85 mole %; 40 to 80 mole %; 40 to 75 mole %; 40 to 70 mole %; 40 to 65 mole %; 40 to 60 mole %; 40 to 55 mole %; 40 to 50 mole %; 45 to 95 mole %; 45 to 90 mole %; 45 to 85 mole %; 45 to 80 mole %; 45 to 75 mole %; 45 to 70 mole %; 45 to 65 mole %; 45 to 60 mole %; 45 to 55 mole %; 50 to 95 mole %; 50 to 90 mole %; 50 to 85 mole %; 50 to 80 mole %; 50 to 75 mole %; 50 to 70 mole %; 50 to 65 mole %; 50 to 60 mole %; 55 to 95 mole %; 55 to 90 mole %; 55 to 85 mole %; 55 to 80 mole %; 55 to 75 mole %; 55 to 70 mole %; 55 to 65 mole %; 60 to 95 mole %; 60 to 90 mole %; 60 to 85 mole %; 60 to 80 mole %; 60 to 75 mole %; 60 to 70 mole %; 65 to 95 mole %; 65 to 90 mole %; 65 to 85 mole %; 65 to 80 mole %; 65 to 75 mole %; 70 to 95 mole %; 70 to 90 mole %; 70 to 85 mole %; 70 to 80 mole %; 75 to 95 mole %; 75 to 90 mole %; 75 to 85 mole %; 80 to 95 mole %; 80 to 90 mole %, based on the total moles of the acid component.

Examples of dicarboxyl monomers used to form polyester polyols of the present invention can include, but are not limited to, isophthalic acid (or dimethyl isophthalate or esters thereof), terephthalic acid (or dimethyl terephthalate or esters thereof), phthalic acid or esters thereof, phthalic anhydride, 1,4-cyclohexane-dicarboxylic acid, 1,3-cyclohexanedicarboxylic acid, hexahydrophthalic anhydride, tetrahydrophthalic anhydride, tetrachlorophthalic anhydride, dodecanedioic acid, sebacic acid, azelaic acid, maleic acid or anhydride, fumaric acid, succinic anhydride, succinic acid, adipic acid, dimer acid, hydrogenated dimer acid, 2,6-naphthalenedicarboxylic acid, glutaric acid, itaconic acid, and their derivatives, diglycolic acid; 2,5-norbornanedicarboxylic acid; 1,4-naphthalenedicarboxylic acid; 2,5-naphthalenedicarboxylic acid; diphenic acid; 4,4'-oxydibenzoic acid; 4,4'-sulfonyidibenzoic acid, and mixtures thereof. In some embodiments, the dicarboxyl monomer may be selected from the group consisting of 1,4-cyclohexanedicarboxylic acid, adipic acid, isophthalic acid, hexahydrophthalic anhydride, and combinations thereof.

In some embodiments, the acid component of the polyester polyol may comprise residues of adipic acid. When present, the acid component may comprise adipic acid residues in an amount of at least about 5 mole %, at least about 10 mole %, at least about 15 mole %, at least about 20 mole %, at least about 25 mole %, at least about 30 mole %, at least about 35 mole %, at least about 40 mole %, at least about 45 mole %, or at least about 50 mole % and/or not more than about 95 mole %, not more than about 90 mole %, not more than about 85 mole %, not more than about 80 mole %, not more than about 75 mole %, not more than about 70 mole %, not more than about 65 mole %, not more than about 60 mole %, not more than about 55 mole %, not more than about 50 mole %, or not more than about 45 mole %. In some embodiments, the acid component of the polyester polyol may comprise not more than 10 mole %, not more than about 5 mole %, not more than about 2 mole %, or not more than about 1 mole percent of residues other than adipic acid.

In some embodiments, the acid component of the polyester polyol may comprise residues of isophthalic acid. When present, the acid component may comprise isophthalic acid residues in an amount of at least about 5 mole %, at least about 10 mole %, at least about 15 mole %, at least about 20 mole %, at least about 25 mole %, at least about 30 mole %, at least about 35 mole %, at least about 40 mole %, at least about 45 mole %, or at least about 50 mole % and/or not more than about 95 mole %, not more than about 90 mole %, not more than about 85 mole %, not more than about 80 mole %, not more than about 75 mole %, not more than about 70 mole %, not more than about 65 mole %, not more than about 60 mole %, not more than about 55 mole %, not more than about 50 mole %, or not more than about 45 mole %. In some embodiments, the acid component of the polyester polyol may comprise not more than 10 mole %, not more than about 5 mole %, not more than about 2 mole %, or not more than about 1 mole percent of residues other than isophthalic acid. In some embodiments, the acid component may comprise not more than 95, not more than about 90, or not more than about 85 mole percent of isophthalic acid.

In some embodiments, the polyester polyol may have an acid component that comprises at least about 10 mole percent of residues of adipic acid and at least about 10 mole percent of residues of isophthalic acid and a diol component that comprises at least about 10 mole percent of residues of diethylene glycol and at least 10 mole percent of residues of TACD. In some embodiments, the polyester polyol may have an acid component comprising about 30 to about 60 mole percent of residues of adipic acid and about 40 to about 70 mole percent of residues of isophthalic acid, based on the total moles of said acid component and a diol component comprising about 20 to about 75 mole percent of residues of diethylene glycol and about 20 to about 75 mole percent of residues of 2,2,4,4-tetramethyl-1,3-cyclobutanediol (TMCD), based on the total moles of said diol component.

In some embodiments, the polyester polyol may have an acid component comprising about 5 to about 100 mole percent of residues of a dicarboxyl monomer selected from the group consisting of 1,4-cyclohexanedicarboxylic acid, adipic acid, isophthalic acid, and hexahydrophthalic acid, based on the total moles of said acid component, and wherein said diol component further comprises about 5 to about 95 mole percent of residues of said at least one diol monomer is selected from the group consisting of 1,4-cyclohexanedimethanol, neopentyl glycol, and combinations thereof, based on the total moles of said diol component, with the remaining residues of the diol component comprising TACD.

In some embodiments, the polyester polyol may have a hydroxyl number in the range of from about 15 to about 120 mg KOH/g and a glass transition temperature in the range of from about −25° C. to 30° C. The polyester polyol may have a hydroxyl number of about 15 to about 50 mg KOH/g and a glass transition temperature of about 10 to 55° C., or about 20 to 55° C. In other embodiments, the polyester polyol may have a Tg of −25° C. to 20° C., a hydroxyl number of 15 to 70 mg KOH/g, and a number average molecular weight of 1500 to 9000 g/mole. In other embodiments, the polyester polyol may have a Tg of 0 to 70° C., a hydroxyl number of 15 to 60 mg KOH/g, and a number average molecular weight of 2000 to 5500 g/mole.

In some embodiments, the acid component of the polyester polyol may comprise lower amounts of certain acids, as compared to conventional polyols. For example, in some embodiments, the acid component of the polyester polyol may comprise not more than 25 mole %, not more than about 20 mole %, not more than about 15 mole %, not more than about 10 mole %, not more than about 8 mole %, not more than about 5 mole %, not more than about 3 mole %, not more than about 2 mole %, not more than about 1 mole %, or not more than about 0.5 mole % of residues of aromatic dicarboxyl monomers, including, but not limited to, terephthalic acid or dimethyl terephthalate, based on the total moles of the acid component.

The resulting polyester polyol may exhibit certain properties that make it particularly useful in adhesive compositions as described herein. For example, in some embodiments, the polyester polyol may have a hydroxyl functionality of 2.1 or less. The hydroxyl functionality of a polyol can be calculated according to the following formula: OH functionality=Mn*N/56100, wherein Mn is the number average molecular weight of the polyester polyol (measured by gel permeation chromatography (GPC) using polystyrene equivalent molecular weight), N is the hydroxyl number of the polyester polyol, measured according to ASTM E222-17. In some embodiments, the polyester polyol may have a hydroxyl functionality of less than 2.1, not more than about 2.05, not more than about 2.01, not more than about 2.0, or not more than about 1.99. In some cases, the polyester polyol as described herein may be thermoplastic and may not be thermosetting. The polyester polyol may not have a hydroxyl functionality greater than 2.1, at least about 2.2, at least about 2.25, at least about 2.3, at least about 2.35, at least about 2.4, at least about 2.45, or at least about 2.5.

According to some embodiments, the polyester polyol as described herein may have a glass transition temperature (Tg) in the range of from −70° C. to 150° C., determined by Differential Scanning calorimetry (DSC) using a TA DSC 2920 from Thermal Analyst Instrument at a scan rate of 20° C./min.

The polyester polyol may have a Tg of at least about −70, at least about −65, at least about −60, at least about −55, at least about −50, at least about −45, at least about −40, at least about −35, at least about −30, at least about −25, at least about −20, at least about −15, at least about −10, at least about −5, at least about 0, at least about 5, at least about 10, at least about 15, at least about 20, or at least about 25° C. and/or not more than about 150, not more than about 145, not more than about 140, not more than about 135, not more than about 130, not more than about 125, not more than about 120, not more than about 115, not more than about 110, not more than about 105, not more than about 100, not more than about 95, not more than about 90, not more than about 85, not more than about 80, not more than about 75, not more than about 70, not more than about 65, not more than about 60, not more than about 55, not more than about 50, not more than about 45, not more than about 40, not more than about 35, not more than about 30, not more than about 25, or not more than about 20° C.

The glass transition temperature (Tg) of polyester polyol may be from −70° C. to 120° C., from −60° C. to −20° C., from −40° C. to −10° C., from −30° C. to 10° C., from −30° C. to 20° C., from −10° C. to 20°, from 0° C. to 30° C., from 20° C. to 50° C., from 30° C. to 60° C., from 40° C. to 70° C., from 50° C. to 80° C., or from 60° C. to 100° C., or from −30 to 30° C., from −30 to 55° C., from −25 to 30° C., from −25 to 25° C., from −25 to 25° C., from −25 to −20° C., from −20 to 20° C., from −15 to 15° C., from −15 to 25° C., from −5 to 75° C., from 0 to 70° C., from 0 to 65° C., from 0 to 60° C., from 0 to 55° C., from 10 to 55° C., from −10 to 35° C., from −70° C. to 100° C., from −60° C. to −10° C., from −50° C. to −10° C., from −40° C. to −10° C., from −30° C. to −10° C., from 0° C. to 100° C., from 10° C. to 80° C., from 20° C. to 70° C., from 30° C. to 70° C., from 40° C. to 70° C.

In some embodiments, the polyester polyol may have a Brookfield viscosity, measured according to ASTM D3236 using a Brookfield DV-1 Prime viscometer Thermosel™ and spindle 27 at the specified temperature (AMETEK Brookfield, Middleborough, MA, US), in the range of from about 0.01 to 200 Pa·s, at 130° C. In some cases, the viscosity of the polyester polyol at 130° C. may be at least about 0.01, at least about 0.05, at least about 0.1, at least about 0.5, at least about 1, at least about 1.5, at least about 2, at least about 2.5, at least about 3, at least about 3.5, at least about 4, at least about 4.5, at least about 5, at least about 5.5, at least about 6, at least about 6.5, at least about 7, at least about 7.5, at least about 8, at least about 9, at least about 10, and/or not more than about 50, not more than about 45, not more than about 40, not more than about 35, not more than about 30, not more than about 27, not more than about 25, not more than about 20, or not more than about 18 Pa·s. In some cases, the Brookfield viscosity of the polyester polyol may be from 0.01 to 50 Pa·s, from 0.1 to 40 Pa·s, from 1 to 35 Pa·s, or from 10 to 25 Pa·s.

In some embodiments, the polyester polyol may have a hydroxyl number in the range of from 5 to 300 mg KOH/g, and/or an acid number of not more than 50 mg KOH/g. Acid number is determined by the titration method in accordance with ASTM D974. Hydroxyl number is determined by ASTM E222-17.

In some embodiments, the polyester polyol may have a hydroxyl number of at least about 5 mg KOH/g, at least about 10 mg KOH/g, at least about 15 mg KOH/g, 20 mg KOH/g, 25 mg KOH/g, 30 mg KOH/g, 35 mg KOH/g, 40 mg KOH/g, 45 mg KOH/g, 50 mg KOH/g, 55 mg KOH/g, 60 mg KOH/g, 65, mg KOH/g, or 70 mg KOH/g. Additionally, or in the alternative, the polyester polyol may have a hydroxyl number of not more than about 300 mg KOH/g, not more than about 250 mg KOH/g, not more than about 200 mg KOH/g, not more than about 150 mg KOH/g, not more than about 100 mg KOH/g, not more than about 75 mg KOH/g, not more than about 70 mg KOH/g, not more than about 65 mg KOH/g, not more than about 60 mg KOH/g, not more than about 55 mg KOH/g, not more than about 50 mg KOH/g, not more than about 45 mg KOH/g, or not more than about 40 mg KOH/g.

In some embodiments, the hydroxyl number of the polyester polyol may be from about 10 to about 300, from about 10 to about 200, from about 10 to about 180, or from about 10 to about 150, or from about 10 to about 120, or from about 10 to about 100, or from about 15 to about 100, from about 25 to about 300, from about 25 to about 200, from about 25 to about 180, or from about 25 to about 150, or from about 25 to about 120, or from about 25 to about 100, or from 30 to about 300, from about 30 to about 200, from about 30 to about 180, or from about 30 to about 150, or from about 30 to about 120, or from about 30 to about 100, or from about 50 to about 300, from about 50 to about 200, from about 50 to about 180, or from about 50 to about 150, or from about 50 to about 120, or from about 50 to about 100 mgKOH/g.

Additionally, or in the alternative, the polyester polyol can have a hydroxyl number of about 10 to about 60 mg KOH/g, about 10 to about 55 mg KOH/g, about 10 to about 50 mg KOH/g, about 10 to about 45 mg KOH/g, about 15 to about 60 mg KOH/g, about 15 to about 55 mg KOH/g, about 15 mg KOH/g to about 55 mg KOH/g, or about 15 to about 50 mg KOH/g, about 15 to about 45 mg KOH/g, about 15 to about 35 mg KOH/g, or about 15 to about 30 mg KOH/g.

In some embodiments, the polyester polyol may have an acid number of not more than about 30 mg KOH/g, not more than about 25 mg KOH/g, not more than about 20 mg KOH/g, not more than about 15 mg KOH/g, not more than about 10 mg KOH/g, or not more than about 5 mg KOH/g. In some embodiments, the acid number of the polyester polyol may be from 0 to about 30, from 3 to about 25, from 3 to about 15, or from 3 to about 12, or from about 5 to about 25, from 5 to about 15, or from 5 to about 12, or from about 8 to about 25, from 8 to about 15, or from 8 to about 12 mgKOH/g. In some embodiments, the polyester polyol may have an acid number from about 0.5 to about 9.0, or from about 0.5 to about 8.0, or about 0.5 to about 7.0, or about 0.5 to about 6.0, or about 0.5 to about 5.0, or about 0.5 to about 4.0, or about 0.5 to about 3.0, or about 0.5 to about 2.

Equivalent ratio of OH/COOH of the polyester polyols described herein denotes the ratio of total OH equivalents/ total COOH equivalents. In certain embodiments, the equivalent ratio (OH/COOH) of a polyester polyol as described herein may be from 1 to 3, or 1.1 to 3, or 1 to 2, or 1.1 to 2, or 1 to 1.5, or 1.1 to 1.5, or 1.0 to 1.3 or, 1.1 to 1.3. The polyester polyol may have an equivalent ratio of at least about 1, at least about 1.1, at least about 1.2, at least about 1.3, at least about 1.4, at least about 1.5, at least about 1.6, at least about 1.7, at least about 1.8, or at least about 1.9 and/or not more than about 3, not more than about 2.9, not more than about 2.8, not more than about 2.7, not more than about 2.6, not more than about 2.5, not more than about 2.4, not more than about 2.3, or not more than about 2.2.

In some embodiments, the number average molecular weight (Mn) of the polyester polyol may be from 500 to 10,000, or from 500 to 9,000, or from 500 to 8,000, or from 500 to 7,000, or from 500 to 6,000, or from 500 to 5,000, or from 500 to 4,000, or from 500 to 3,000, or from 1,000 to 10,000, or from 1,000 to 9,000, or from 1,000 to 8,000, or from 1,000 to 7,000, or from 1,000 to 6,000, or from 1,000 to 5,000, or from 1,000 to 4,000, or from 1,000 to 3,000, or from 2,000 to 7,000, or from 2,000 to 6,000, or from 2,000 to 5,000, or from 2,000 to 4,000, or from 3,000 to 7,000, or from 3,000 to 6,000, or from 3,000 to 5,000 g/mole.

The Mn of the polyester polyol may be at least about 500, at least about 750, at least about 1000, at least about 1050, at least about 1100, at least about 1150, at least about 1200, at least about 1250, at least about 1300, at least about 1350, at least about 1400, at least about 1450, at least about 1500, at least about 1550, at least about 1600, at least about 1650, at least about 1700, at least about 1750, at least about 1800, at least about 1850, at least about 1900, at least about 1950, at least about 2000, at least about 2100, at least about 2200, at least about 2300, at least about 2400, at least about 2500, at least about 2600, at least about 2700, at least about 2800, at least about 2900, at least about 3000, at least about 3100, at least about 3200, at least about 3300, at least about 3400, at least about 3500, at least about 3600, at least about 3700, at least about 3800, at least about 3900, at least about 4000, at least about 4100, at least about 4200, at least about 4300, at least about 4400, or at least about 4500 g/mole.

Additionally, or in the alternatively, the Mn of the polyester polyol may be not more than about 10,000, not more than about 9900, not more than about 9800, not more than about 9700, not more than about 9600, not more than about 9500, not more than about 9400, not more than about 9300, not more than about 9200, not more than about 9100, not more than about 9000, not more than about 8900, not more than about 8800, not more than about 8700, not more than about 8600, not more than about 8500, not more than about 8400, not more than about 8300, not more than about 8200, not more than about 8100, not more than about 8000, not more than about 7900, not more than about 7800, not more than about 7700, not more than about 7600, not more than about 7500, not more than about 7400, not more than about 7300, not more than about 7200, not more than about 7100, not more than about 7000, not more than about 6900, not more than about 6800, not more than about 6700, not more than about 6600, not more than about 6500, not more than about 6400, not more than about 6300, not more than about 6200, not more than about 6100, not more than about 6000, not more than about 5900, not more than about 5800, not more than about 5700, not more than about 5600, or not more than about 5500 g/mole.

The weight average molecular weight (Mw) of the polyester polyol may be from 1,000 to 100,000, from 1,500 to 50,000, or from 1,500 to 15,000, or from 1,500 to 12,000, or from 2,000 to 10,000 g/mole. Molecular weights are measured by gel permeation chromatography (GPC) using polystyrene equivalent molecular weight.

In some embodiments, the Mw of the polyester polyol may be from 500 to 10,000, or from 500 to 9,000, or from 500 to 8,000, or from 500 to 7,000, or from 500 to 6,000, or from 500 to 5,000, or from 500 to 4,000, or from 500 to 3,000, or from 1,000 to 10,000, or from 1,000 to 9,000, or from 1,000 to 8,000, or from 1,000 to 7,000, or from 1,000 to 6,000, or from 1,000 to 5,000, or from 1,000 to 4,000, or from 1,000 to 3,000, or from 2,000 to 7,000, or from 2,000 to 6,000, or from 2,000 to 5,000, or from 2,000 to 4,000, or from 3,000 to 7,000, or from 3,000 to 6,000, or from 3,000 to 5,000 g/mole.

The Mw of the polyester polyol may be at least about 500, at least about 750, at least about 1000, at least about 1050, at least about 1100, at least about 1150, at least about 1200, at least about 1250, at least about 1300, at least about 1350, at least about 1400, at least about 1450, at least about 1500, at least about 1550, at least about 1600, at least about 1650, at least about 1700, at least about 1750, at least about 1800, at least about 1850, at least about 1900, at least about 1950, at least about 2000, at least about 2100, at least about 2200, at least about 2300, at least about 2400, at least about 2500, at least about 2600, at least about 2700, at least about 2800, at least about 2900, at least about 3000, at least about 3100, at least about 3200, at least about 3300, at least about 3400, at least about 3500, at least about 3600, at least about 3700, at least about 3800, at least about 3900, at least about 4000, at least about 4100, at least about 4200, at least about 4300, at least about 4400, or at least about 4500 g/mole.

Additionally, or in the alternatively, the Mw of the polyester polyol may be not more than about 10,000, not more than about 9900, not more than about 9800, not more than about 9700, not more than about 9600, not more than about 9500, not more than about 9400, not more than about 9300, not more than about 9200, not more than about 9100, not more than about 9000, not more than about 8900, not more than about 8800, not more than about 8700, not more than about 8600, not more than about 8500, not more than about 8400, not more than about 8300, not more than about 8200, not more than about 8100, not more than about 8000, not more than about 7900, not more than about 7800, not more than about 7700, not more than about 7600, not more than about 7500, not more than about 7400, not more than about 7300, not more than about 7200, not more than about 7100, not more than about 7000, not more than about 6900, not more than about 6800, not more than about 6700, not more than about 6600, not more than about 6500, not more than about 6400, not more than about 6300, not more than about 6200, not more than about 6100, not more than about 6000, not more than about 5900, not more than about 5800, not more than about 5700, not more than about 5600, or not more than about 5500 g/mole.

In some embodiments, the polyester polyol may have an inherent viscosity (IV) less than longer-chain polyesters. For example, in some embodiments, the polyester polyol may have an IV of not more than about 0.4 dL/g, measured in a 60/40 (wt/wt) phenol/tetrachloroethane at a concentration of 0.5 g/100 mL at 25° C. In some embodiments, the polyester polyol may have an IV of at least about 0.01, at least about 0.05, at least about 0.10, at least about 0.15, at least about 0.20, at least about 0.25, at least about 0.30 dL/g and/or not more than about 0.50, not more than about 0.45, not more than about 0.40, not more than about 0.35, not more than about 0.30, not more than about 0.25, or not more than about 0.20 dL/g.

In some embodiments, a method for making a polyester polyol is provided that includes reacting at least one dicarboxyl monomer with at least one diol comprising 2,2,4,4-tetraalkyl-1,3-cyclobutanediol (TACD) to form a polyester polyol as described herein. During the reacting step, the reaction medium may be heated so that the highest average temperature of the reaction medium reached is at least about 200, at least about 205, at least about 210, at least about 215, at least about 220, at least about 225, at least about 230, at least about 235, at least about 240, or at least about 245 and/or not more than about 300, not more than about 290, not more than about 280, not more than about 270, not more than about 265, not more than about 260, not more than about 255, not more than about 250, or not more than about 240° C.

Despite being conducted at lower-than-expected temperatures, the reaction medium used to form the polyester polyol may comprise little or no azeotroping solvent such as, for example, A150. In some cases, the reaction for forming the polyester polyol may be carried out in the presence of not more than 20, not more than about 15, not more than about 10, not more than about 8, not more than about 5, not more than about 3, not more than about 2, not more than about 1, or not more than about 0.5 weight percent of an azeotroping solvent, based on the total weight of the reaction medium.

All or a portion of the reaction may take place under vacuum so that, for example, the pressure can be at least about 5, at least about 10, at least about 15, at least about 20, or at least about 25 torr and/or not more than about 500, not more than about 450, not more than about 400, not more than about 350, not more than about 300, not more than about 250, not more than about 200, not more than about 150, not more than about 100, or not more than about 75 torr. The reaction pressure can be in the range of from about 5 to about 200 torr, about 10 to about 150 torr, or about 20 to about 100 torr.

In some embodiments, the reaction used to form the polyester polyol may be carried out in the presence of at least one catalyst. In some cases, the catalyst may be present in an amount of at least about 0.1, at least about 0.5, at least about 1, at least about 1.5, or at least about 2 weight percent and/or not more than about 20, not more than about 15, not more than about 10, not more than about 5, or not more than about 3 weight percent, based on the total weight of the reaction medium.

In some embodiments, the catalyst may be present in the reaction medium in an amount of at least about 5, at least about 10, at least about 15, at least about 20, at least about 30, at least about 40, at least about 45, at least about 50, or at least about 55 parts per million by weight (ppmw) and/or not more than about 1000, not more than about 900, not more than about 800, not more than about 700, not more than about 600, not more than about 500, not more than about 450, not more than about 400, not more than about 350, not more than about 300, not more than about 250 ppmw, based on the total weight of the reaction medium.

Any suitable type of catalyst may be used, although in some embodiments, the catalyst may not be or comprise a tin-containing catalyst. In some embodiments, the catalyst may comprise not more than about 5, not more than about 4, not more than about 3, not more than about 2, not more than about 1, or not more than about 0.5 mole percent tin, based on the total weight of the catalyst, or it may include no tin. The catalyst may instead comprise titanium or other metal in an amount of at least about 1, at least about 2, at least about 5, at least about 10, or at least about 25 mole percent and/or not more than about 90, not more than about 85, not more than about 80, not more than about 75, or not more than about 70 mole percent, based on the total moles of the catalyst. In some embodiments, the catalyst can comprise titanium isopropoxide.

Polyester polyols according to embodiments of the present invention may be particularly suitable for use in a variety of adhesive compositions and, in particular, for use in polyurethane adhesive compositions. Polyurethane is formed by reacting a polyester polyol having hydroxyl functionality with an isocyanate having two or more isocyanate functional groups. In some cases, at least a portion of this reaction can occur prior to use of the adhesive so that, for example, the adhesive composition comprises an isocyanate-containing polyurethane prepolymer. Alternatively, or in addition, the reaction may occur while the adhesive is being applied so that the polyurethane polymer is being formed in situ on the substrate. Various embodiments of specific types of adhesive compositions are discussed herein.

The amount of polyester polyol in the adhesive composition may vary depending on the specific application. In some embodiments, the polyester may be present in the adhesive composition (or a precursor thereto) in an amount of at least about 2, at least about 5, at least about 10, at least about 15, at least about 20, at least about 25, at least about 30, at least about 35, or at least about 40 weight percent and/or not more than about 90, not more than about 85, not more than about 80, not more than about 75, not more than about 70, not more than about 65, not more than about 60, not more than about 55, not more than about 50, or not more than about 45 weight percent, based on the total weight of the adhesive composition.

The polyester polyol may be present in the adhesive composition alone, or in combination with one or more other polyols including, but not limited to, various other polyester polyols or polyether polyols. In some embodiments, particularly when the adhesive is a hot melt adhesive, the composition may include a blend of two or more polyols. In some cases, the polyols other than the TMCD-containing polyol may be polyester polyols, polyether polyols, or combinations thereof.

When present in a blend, the polyester polyol comprising residues of TMCD can be present in the composition in an amount of at least about 5, at least about 10, at least about 15, at least about 20, at least about 25, at least about 30, at least about 35, at least about 40, at least about 45, at least about 50, at least about 55, at least about 60, at least about 65, at least about 70 and/or not more than about 95, not more than about 90, not more than about 85, not more than about 80, not more than about 75, not more than about 70, not more than about 65, or not more than about 60 weight percent, based on the total weight of the active components. As used herein, the term "active components" refers to the components of an adhesive composition such as the polyol, isocyanate, and additives but does not include solvents or any inert components.

In some embodiments, hot melt adhesives as described herein may include at least one amorphous polyester polyol, a semi-crystalline polyester polyol, and/or a polyether polyol, in combination with the polyester polyol comprising residues of TMCD described herein. Examples of amorphous polyols include, but are not limited to, high Tg amorphous polyols such as, Dynacoll 7100 (commercially available from Evonik), Stepanpol PN-110 (commercially available from Stephan), and HS 2F-136P and HS 2F-306P (commercially available from Hokoku Corporation). High Tg amorphous polyester polyols may be present in the adhesive blend in an amount of at least about 5, at least about 10, at least about 15 weight percent and/or not more than about 50, not more than about 45, not more than about 40, not more than about 35, or not more than about 30 weight percent, based on the total weight of the composition.

Additionally, or in the alternative, the adhesive blend may also comprise at least one low Tg amorphous polyester polyol. Examples of such a polyester polyol include, but are not limited to, Dynacoll 7200 (commercially available from Evonik). Such polyols may be present in the composition in the same amount as described previously and may be used alone or in combination with a higher Tg amorphous polyester.

In some embodiments, the adhesive blend may further comprise a semi-crystalline polyester polyol in combination with the TMCD-containing polyester polyol described herein. Examples of such polyester polyols can include, but are not limited to, Dynacoll 7300 series polyols (commercially available from Evonik) PC-205P-30 (commercially available from Stepan), and HS 2H-351A and HS2H-3505 (commercially available from Hokoku Corporation). The amount of semi-crystalline polyester polyol may be 0, or at least about 5, at least about 10, at least about 15, at least about 20, at least about 25, at least about 30, at least about 35 and/or not more than about 55, not more than about 50, not more than about 45, not more than about 40, not more than about 35, not more than about 30, or not more than about 25 weight percent, based on the total weight of the composition. These ranges may also apply to the amount of the TMCD-containing polyester polyol described herein in an adhesive composition.

Additionally, or in the alternative, the adhesive composition may comprise at least one polyether polyol. Examples of suitable polyether polyols include, but are not limited to, Voranol 2120 and 2000LM (commercially available from Dow Chemical). In some embodiments, the polyether polyol may be used in an amount of 0, or at least about 5, at least about 10, at least about 15, at least about 20, at least about 25, at least about 30, at least about 35 and/or not more than about 55, not more than about 50, not more than about 45, not more than about 40, not more than about 35, not more than about 30, or not more than about 25 weight percent, based on the total weight of the composition.

In some embodiments, the adhesive composition may only include the polyester polyol including TMCD residues as described herein. In some cases, the adhesive composition may comprise not more than about 20, not more than about 15, not more than about 10, not more than about 5, not more than about 3, not more than about 2, not more than about 1, or not more than about 0.5 weight percent of polyols other than the TMCD-containing polyol described herein, based on the total weight of the adhesive composition.

The adhesive composition may also include at least one isocyanate. The isocyanate may comprise a diisocyanate and may be present in the adhesive composition (or a precursor thereto) in an amount of at least about 0.1, at least about 0.5, at least about 1, at least about 1.5, at least about 2, at least about 2.5, at least about 5, at least about 8, at least about 10, at least about 15 and/or not more than about 50, not more than about 45, not more than about 40, not more than about 35, not more than about 30, not more than about 25, not more than about 20, not more than about 15, not more than about 10, not more than about 8, not more than about 5, not more than about 3, not more than about 1.5, not more than about 1, or not more than about 0.5 weight percent, based on the total weight of the adhesive composition (or its precursor).

Suitable isocyanates may be difunctional or multifunctional isocyanates having, for example, two or more isocyanate functional groups. Such isocyanates may be aromatic or aliphatic. Examples of aliphatic isocyanates include isophorone diisocyanate (IPDI), hexamethylene diisocyanate (HDI), tetramethylene diisocyanate, methylene bis(4-cyclohexylisocyanate) (HMDI), m-xylylene diisocyanate, p-xylylene diisocyanate, 1,3-bis(isocyanatomethyl)cyclohexane, 1,4-bis(isocyanatomethyl)cyclohexane, cyclohexylene diisocyanate, 1,3-bis(1-isocyanato-1-methylethyl)benzene, HDI trimer, HDI biuret, HDI uretdione, IPDI trimer, and mixtures thereof. The isocyanate may also comprise dimers or trimers of any of the above compounds. Examples of aromatic isocyanates include methylenediphenyl diisocyanate (MDI), polymeric MDI (PMDI), toluene diisocyanate (TDI), naphthalene diisocyanate, 4,4'-stilbene diisocyanate, and mixtures thereof.

According to some embodiments, the isocyanate may be selected from the group consisting of isophorone diisocyanate (IPDI), hexamethylene diisocyanate (HDI), tetramethylene diisocyanate, methylene bis(4-cyclohexylisocyanate) (HMDI), m-xylylene diisocyanate, p-xylylene diisocyanate, 1,3-bis(isocyanatomethyl)cyclohexane, 1,4-bis(isocyanatomethyl)cyclohexane, cyclohexylene diisocyanate, 1,3-bis(1-isocyanato-1-methylethyl)benzene, methylenediphenyl diisocyanate (MDI), polymeric MDI (PMDI), toluene diisocyanate (TDI), naphthalene diisocyanate, 4,4'-stilbene diisocyanate, and mixtures thereof. In some embodiments, the isocyanate is selected from the group consisting of hexamethylene diisocyanate (HDI) trimer, isophorone diisocyanate (IPDI) trimer, and combinations thereof. In other embodiments, the isocyanate is selected from the group consisting of 2,4'-methylene diphenyl diisocyanate (2,4-MDI), 4,4'-methylene diphenyl diisocyanate (4,4-MDI), and combinations thereof.

In some embodiments, modified isocyanates may be used. For example, in some embodiments, the isocyanate may be modified with acrylic groups. Modified isocyanates can include modified methylenediphenyl diisocyanate selected from the group consisting of a carbodiimide-modified methylenediphenyl diisocyanate, an allophanate-modified methylenediphenyl diisocyanate, a biuret-modified methylenediphenyl diisocyanate, and combinations thereof.

In some embodiments, the adhesive composition can have an R value in the range of from 0.5 to 4. As used herein, the "R" value is the equivalent ratio of isocyanate groups to hydroxyl groups in a composition. In some embodiments, the R value can be at least about 0.75, at least about 0.90, at least about 1, at least about 1.1, at least about 1.2, at least about 1.3, at least about 1.4, at least about 1.5, at least about 1.6, at least about 1.7, at least about 1.8, at least about 1.9, or at least about 2 and/or not more than about 4, not more than about 3.9, not more than about 3.8, not more than about 3.7, not more than about 3.6, not more than about 3.5, not more than about 3.4, not more than about 3.3, not more than about 3.2, not more than about 3.1, or not more than about 3.

The adhesive composition may also include one or more other components such as, for example, a tackifier. The tackifier may help improve the adhesive properties, including but not limited to the viscosity, wetting behavior, adhesion, particularly to low energy surfaces, and viscoelastic behavior of the finished adhesive composition. The tackifier resin selected may vary depending on the exact curable composition and the balance of properties needed in an application, such as peel strength, shear strength, and tack.

Tackifier resins that may be present in the adhesive compositions described herein may include, but are not limited to, cycloaliphatic hydrocarbon resins, C5 hydrocarbon resins, C5/C9 hydrocarbon resins, aromatically modified C5 resins (commercially available as Piccotac™ resins, Eastman Chemical Company, TN, US), C9 hydrocarbon resins (commercially available as Picco™ resins, Eastman), pure monomer resins (e.g., copolymers of styrene with alpha-methyl styrene, vinyl toluene, para-methyl styrene, indene, and methyl indene) (commercially available as Kristalex™ resins, Eastman), DCPD resins, dicyclopentadiene based/containing resins, cyclo-pentadiene based/containing resins, terpene resins (commercially available as Sylvares™ resins, AZ Chem Holdings, LP, Jacksonville, FL, US), terpene phenolic resins, terpene styrene resins, esters of rosin (commercially available as Permalyn™ resins, Eastman), esters of modified rosins, liquid resins of fully or partially hydrogenated rosins, fully or partially hydrogenated rosin esters (commercially available as Foral™ and Foralyn™ resins, Eastman), fully or partially hydrogenated modified rosin resins, fully or partially hydrogenated rosin alcohols, fully or partially hydrogenated C5 resins, fully or partially hydrogenated C5/C9 resins, fully or partially hydrogenated DCPD resins (commercially available as Escorez® 5000-series resin, ExxonMobil Chemical Company, TX, US), fully or partially hydrogenated dicyclopentadiene based/containing resins, fully or partially hydrogenated cyclo-pentadiene based/containing resins, fully or partially hydrogenated aromatically modified C5 resins, fully or partially hydrogenated C9 resins (commercially available as Regalite™ resins, Eastman), fully or partially hydrogenated pure monomer resins (e.g., copolymers or styrene with alpha-methyl styrene, vinyl toluene, para-methyl styrene, indene, and methyl indene) (commercially available as Regalrez™ resins, Eastman), fully or partially hydrogenated C5/cycloaliphatic resins (commercially available as Eastotac™ resins, Eastman), fully or partially hydrogenated C5/cycloaliphatic/styrene/C9 resins, fully or partially hydrogenated cycloaliphatic resins, and mixtures thereof.

When present, the tackifier may also include, for example, rosin esters, such as glycerol rosin ester, pentaerythritol rosin ester, and hydrogenated rosin resins, and hydrocarbon resins.

In some embodiments, the adhesive composition may include at least about 5, at least about 10, at least about 15, at least about 20, or at least about 25 and/or not more than about 50, not more than about 45, not more than about 40, not more than about 35, not more than about 30, or not more than about 25 weight percent of at least one tackifier. In some cases, the adhesive composition may comprise less than about 5, less than about 3, less than about 2, less than about 1, or less than about 0.5 weight percent of tackifiers, based on the total weight of the composition.

Additionally, or in the alternative, the adhesive composition may further comprise one or more reactive or non-reactive vinyl polymers to further improve the desirable properties such as cure time, bond strength, cohesion, and mechanical strength. Examples of such vinyl polymers include homopolymers and copolymers of ethylenically unsaturated monomers selected from the group comprising methyl acrylate, methyl methacrylate, ethyl acrylate, ethyl methacrylate, butyl acrylate, butyl methacrylate, isobutyl acrylate, isobutyl methacrylate, 2-ethylhexyl methacrylate, 2-ethylhexyl acrylate, isoprene, octyl acrylate, octyl methacrylate, iso-octyl acrylate, iso-octyl methacrylate, isobornyl (meth)acrylate, cyclohexyl (meth)acrylate, hydroxymethyl (meth)acrylate, hydroxyethyl (meth)acrylate, hydroxypropyl (meth)acrylate, hydroxylbutyl (meth)acrylate, acetoacetoxy ethyl methacrylate, acetoacetoxy ethyl acrylate, methyl 2-(hydroxymethyl)acrylate, ethyl 2-(hydroxymethyl)acrylate, isopropyl 2-(hydroxymethyl)acrylate, n-butyl 2-(hydroxymethyl)acrylate, t-butyl 2-(hydroxymethyl)acrylate, vinyl ester such as vinyl acetate, vinyl alcohol, vinyl ether, styrene, alkylstyrene, butadiene, and acrylonitrile. The reactive vinyl polymers can have functionalities such as, for example, hydroxyl, acetoacetate, and carbamate that are reactive toward isocyanates, or they may have isocyanate functionality that is moisture curable. The vinyl polymers may be used in various adhesive formulations including solvent-borne, solventless, and hot melt types.

In some embodiments, the adhesive of the present invention may further comprise one or more catalysts or activating agents selected from the group comprising dibutyl tin dilaurate, dibutyl tin diacetate, dioctyl tin diacetate, 1,8-diazabicyclo-[5.4.0]undec-7-ene (DBU), 1,5-diazabicyclo[4.3.0]non-5-ene (DBN), 1,5,7-triazabicyclo[4.4.0]dec-5-ene (TBD), 7-methyl-1,5,7-triazabicyclo[4.4.0]dec-5-ene (MTBD), 1,1,3,3-tetramethylguanidine (TMG), 1,4-diazabicyclo[2.2.2]octane (DABCO), 2,2'-di morpholinodieethylether (DMDEE), and combinations thereof.

In some embodiments, the adhesive composition may be a two part or two-pack (also called a two-component or 2K) adhesive system. Such systems include two separate components or portions, one including the polyol and the other including the isocyanate. These components are stored separately, then combined just prior to or during application of the adhesive, at which point the polyol and isocyanate react to form a polyurethane in situ. Such reactions can occur at room temperature or at an elevated temperature. One or both of the components may include other compounds such as, for example, solvents or other additives.

In some embodiments, the polyol may be pre-reacted with an isocyanate to provide an isocyanate-terminated polyurethane prepolymer. The polyurethane prepolymer may be prepared by bulk polymerization or solution polymerization. The reaction may be carried out under anhydrous conditions to prevent crosslinking of the isocyanate groups by moisture. The polyurethane prepolymer may comprise residues of at least one polyester polyol as described herein and at least one isocyanate.

This isocyanate-functional prepolymer, present in one component of the adhesive, may then be reacted further with a polyol, in another component, when part of a two-component (2K) adhesive composition. In some embodiments, one or both parts of the 2K adhesive may further include at least one solvent. A 2K solvent-borne adhesive can be used in applications for, for example, flexible packaging, textile, auto interior, wood working, assembly of electronic components, and potting for electronics.

Examples of suitable solvents can include, but are not limited to, ethyl acetate, n-butyl acetate, isobutyl acetate, t-butyl acetate, n-propyl acetate, isopropyl acetate, methyl acetate, ethanol, n-propanol, isopropanol, sec-butanol, isobutanol, ethylene glycol monobutyl ether, propylene glycol n-butyl ether, propylene glycol methyl ether, propylene glycol monopropyl ether, dipropylene glycol methyl ether, diethylene glycol monobutyl ether, ethyl-3-ethoxypropionate, xylene, toluene, acetone, methyl amyl ketone, methyl isoamyl ketone, methyl ethyl ketone, cyclopentanone, and cyclohexanone.

When a solvent is present, the adhesive may have a solids content of at least about 10, at least about 15, at least about 20, at least about 25, at least about 30, at least about 35, at least about 40, or at least about 45 weight percent and/or less than about 90, not more than about 85, not more than about 80, not more than about 75, not more than about 70, not more than about 65, not more than about 60, not more than about 55, not more than about 50, or not more than about 45 percent, based on the total weight of the adhesive composition.

Alternatively, the isocyanate-terminated polyurethane prepolymer may react with moisture (added or in the environment) at the time the adhesive is applied. Such moisture-cure adhesive compositions may be considered one-part (1K) adhesive compositions. Although not wishing to be bound by theory, it is assumed that, in such moisture-cure systems, the isocyanate functionality of the polyurethane prepolymer first reacts with water to yield an amine functional compound, which then further reacts with the isocyanate group on another polymer molecule. A 1K moisture-cure adhesive can have utility in, for example, auto exterior, building and construction, textiles, wood working, assembly of electronic components, and potting for electronics.

In some embodiments, the adhesive composition can be a hot melt adhesive or a reactive hot melt adhesive composition. When the adhesive is a hot melt, it may comprise a solventless or solid composition and may be heated during all or a portion of its application. When the adhesive composition is solventless, it may have a solids content of at least about 90, at least about 92, at least about 95, at least about 97, at least about 99, or at least about 99.5 weight percent, based on the total weight of the adhesive. Solventless adhesives may be in the form of pellets, powders, sticks, or other masses solid at room temperature and pressure.

When the adhesive composition is a hot melt (or reactive hot melt) adhesive, it may be applied by heating the adhesive to a temperature of at least about 50, at least about 55, at least about 60, at least about 65, at least about 70, at least about 75, at least about 80, at least about 85, at least about 90, at least about 95, at least about 100, at least about 105, at least about 110, at least about 115, at least about 120, at least about 125, at least about 130, at least about 135, or at least about 140° C. and/or not more than about 200, not more than about 195, not more than about 190, not more than about 185, not more than about 180, not more than about 175, not more than about 170, not more than about 165, not more than about 160, not more than about 155, or not more than about 150° C. Hot melt adhesive compositions according to embodiments of the invention can be single component or two-component adhesives. Typical methods of applying the hot melt adhesive include, but are not limited to, a roll coater, sprayer, or a glue gun.

Adhesive compositions as described herein may have enhanced properties as compared to adhesives formulated with conventional polyols. For example, adhesive compositions according to embodiments of the present invention may have both greater initial bond strength (offline bond strength), as well as higher levels of both thermal and chemical resistance. This makes the adhesives suitable for a variety of end use applications, from woodworking to electronics to flexible packaging and automotive finishes. Such adhesives exhibit high offline bond strength, quickly reach substrate failure, have a high chemical and thermal resistance, while avoiding polyols including certain monomers, while achieving these properties with various isocyanates and on multiple laminate structures.

In some embodiments, adhesive compositions as described herein may have an offline bond strength in the range of from 100 to 1000 grams per inch (g/in). Offline Bond Strength is measured according to ASTM F904-16 immediately after lamination according to the procedure described in Example 3. The offline bond strength exhibited by the present invention can be at least about 150, at least about 200, at least about 250, at least about 300, at least about 350, at least about 400, at least about 450, at least about 500, or at least about 550 and/or not more than about 1000, not more than about 950, not more than about 900, not more than about 850, not more than about 800, not more than about 750, not more than about 700, not more than about 650, or not more than about 600 g/in.

In some embodiments, the offline bond strength of the adhesive composition can be at least about 5, at least about 10, at least about 15, at least about 20, at least about 25, at least about 30, at least about 35, at least about 40, at least about 45, at least about 50, at least about 55, at least about 60, at least about 65, at least about 70, at least about 75, at least about 80 percent, or at least about 90 percent higher than an identical adhesive composition formed with a polyester polyol having an acid component comprising 58 mole % adipic acid (AD) and 42 mole % isophthalic acid (IPA) and a diol component comprising 25 mole % diethylene glycol (DEG) and 75 mole % ethylene glycol with a hydroxyl number of 24 KOH/g, and a glass transition temperature of −21° C., all other components of said adhesive composition being the same.

Alternatively, or in addition, the offline bond strength of the adhesive composition can be at least about 5, at least about 10, at least about 15, at least about 20, at least about 25, at least about 30, at least about 35, at least about 40, at least about 45, at least about 50, at least about 55, at least about 60, at least about 65, at least about 70, at least about 75, at least about 80 percent, or at least about 90 percent higher than an identical adhesive composition formed with a polyester polyol that has an acid component comprising 50 mole % terephthalic acid (TPA) and 50 mole % isophthalic acid (IPA) and a diol component comprising 52 mole % neopentyl glycol (NPG) and 48 mole % ethylene glycol with a hydroxyl number of 45 mg KOH/g, a glass transition temperature of 50° C., and a melt viscosity of 130° C. at 60 Pa, all other components being the same.

Adhesive compositions as described herein may have a 24-hour bond strength, measured as described in Example 4, in the range of from about 200 to about 3000 g/in. The 24-hour bond strength of the adhesive composition can be at least about 250, at least about 300, at least about 350, at least about 400, at least about 450, at least about 500, at least about 550, at least about 600, at least about 650, at least about 700, at least about 750, at least about 800, at least about 850, at least about 900, at least about 950, at least about 1000, at least about 1050, at least about 1100, at least about 1150, or at least about 1200 and/or not more than about 3000, not more than about 2500, not more than about 2000, not more than about 1500, not more than about 1000, not more than about 950, not more than about 900, not more than about 850, not more than about 800, not more than about 750, or not more than about 700 g/in.

In some embodiments, the 24 hour bond strength of the adhesive composition can be at least about 5, at least about 10, at least about 15, at least about 20, at least about 25, at least about 30, at least about 35, at least about 40, at least about 45, at least about 50, at least about 55, at least about 60, at least about 65, at least about 70, at least about 75, at least about 80 percent, or at least about 90 percent higher than an identical adhesive composition formed with a polyester polyol having an acid component comprising 58 mole % adipic acid (AD) and 42 mole % isophthalic acid (IPA) and a diol component comprising 25 mole % diethylene glycol (DEG) and 75 mole % ethylene glycol with a hydroxyl number of 24 KOH/g, and a glass transition temperature of −21° C., all other components of said adhesive composition being the same.

Additionally, or in the alternative, the 24 hour bond strength of the adhesive composition can be at least about 5, at least about 10, at least about 15, at least about 20, at least about 25, at least about 30, at least about 35, at least about 40, at least about 45, at least about 50, at least about 55, at least about 60, at least about 65, at least about 70, at least about 75, at least about 80 percent, or at least about 90 percent higher than an identical adhesive composition formed with a polyester polyol that has an acid component comprising 50 mole % terephthalic acid (TPA) and 50 mole % isophthalic acid (IPA) and a diol component comprising 52 mole % neopentyl glycol (NPG) and 48 mole % ethylene glycol with a hydroxyl number of 45 mg KOH/g, a glass transition temperature of 50° C., and a melt viscosity of 130° C. at 60 Pa, all other components being the same.

In some embodiments, the adhesive composition may have a chemical resistance, measured as described in Example 5, in the range of 200 to 1000 g/in, measured after boil-in-bag with 1:1:1 food simulant. The adhesive composition can have a chemical resistance after boil-in-bag with 1:1:1 food simulant can be at least about 250, at least about 300, at least about 350, at least about 400, at least about 450, or at least about 500 and/or not more than about 1000, not more than about 950, not more than about 900, not more than about 850, not more than about 800, not more than about 750, not more than about 700, not more than about 650, or not more than about 600 g/in.

Such a chemical resistance may be at least about 5, at least about 10, at least about 15, at least about 20, at least about 25, at least about 30, at least about 35, at least about 40, at least about 45, at least about 50, at least about 55, at least about 60, at least about 65, at least about 70, at least about 75, at least about 80 percent, or at least about 90 percent higher than an identical adhesive composition formed with a polyester polyol having an acid component comprising 58 mole % adipic acid (AD) and 42 mole % isophthalic acid (IPA) and a diol component comprising 25 mole % diethylene glycol (DEG) and 75 mole % ethylene glycol with a hydroxyl number of 24 KOH/g, and a glass transition temperature of −21° C., all other components of said adhesive composition being the same.

Alternatively, or in addition, the chemical resistance of the adhesive composition can be at least about 5, at least about 10, at least about 15, at least about 20, at least about 25, at least about 30, at least about 35, at least about 40, at least about 45, at least about 50, at least about 55, at least about 60, at least about 65, at least about 70, at least about 75, at least about 80 percent, or at least about 90 percent higher than an identical adhesive composition formed with a polyester polyol that has an acid component comprising 50 mole % terephthalic acid (TPA) and 50 mole % isophthalic acid (IPA) and a diol component comprising 52 mole % neopentyl glycol (NPG) and 48 mole % ethylene glycol with a hydroxyl number of 45 mg KOH/g, a glass transition temperature of 50° C., and a melt viscosity of 130° C. at 60 Pa, all other components being the same.

In some embodiments, the adhesive composition may exhibit a thermal resistance of 200 to 800 g/in at 90° C., measured as described in Example 6. The thermal resistance of the adhesive composition can be at least about 250, at least about 300, at least about 350, at least about 400, at least about 450, at least about 500 and/or not more than about 800, not more than about 750, not more than about 700, not more than about 650, not more than about 600, or not more than about 550 g/in.

Such a thermal resistance may be at least about 5, at least about 10, at least about 15, at least about 20, at least about 25, at least about 30, at least about 35, at least about 40, at least about 45, at least about 50, at least about 55, at least about 60, at least about 65, at least about 70, at least about 75, at least about 80 percent, or at least about 90 percent higher than an identical adhesive composition formed with a polyester polyol having an acid component comprising 58 mole % adipic acid (AD) and 42 mole % isophthalic acid (IPA) and a diol component comprising 25 mole % diethylene glycol (DEG) and 75 mole % ethylene glycol with a hydroxyl number of 24 KOH/g, and a glass transition temperature of −21° C., all other components of said adhesive composition being the same.

Additionally, or in the alternatively, the adhesive composition can exhibit a thermal resistance that is at least about 5, at least about 10, at least about 15, at least about 20, at least about 25, at least about 30, at least about 35, at least about 40, at least about 45, at least about 50, at least about 55, at least about 60, at least about 65, at least about 70, at least about 75, at least about 80 percent, or at least about 90 percent higher than an identical adhesive composition formed with a polyester polyol that has an acid component comprising 50 mole % terephthalic acid (TPA) and 50 mole % isophthalic acid (IPA) and a diol component comprising 52 mole % neopentyl glycol (NPG) and 48 mole % ethylene glycol with a hydroxyl number of 45 mg KOH/g, a glass transition temperature of 50° C., and a melt viscosity of 130° C. at 60 Pa, all other components being the same In some cases, the adhesive composition may exhibit a time to achieve substrate failure of less than 24 hours, measured as described in Example 4. The time to achieve substrate failure is the amount of time required for the adhesive to cure at 50° C. before substrate failure occurs. In some cases, the time to substrate failure is not more than 20, 15, 12, 10, 5, or 2 hours, and sometimes it occurs without curing the adhesive (offline peel testing).

In some embodiments, the adhesive composition may exhibit one or more of the above properties. For example, the adhesive composition may have an offline bond strength within one or more of the above ranges, as well a 24-hour bond strength, offline bond strength, chemical resistance, thermal resistance, and time to substrate failure within one or more of the above ranges. In some cases, the adhesive composition exhibits values within the above ranges for one, two, three, four, or five of the above properties.

In some embodiments, adhesive compositions formed as described herein may exhibit a lower reduction in bond strength than would be expected from a conventional adhesive. For example, in some embodiments, the adhesive composition comprising CHDM-containing polyester polyols can have a reduction in bond strength of not more than 50, not more than about 45, not more than about 40, not more than about 35, not more than about 30, or not more than about 25 percent, measured according to the following formula: (Bond Strength Before Curing−Bond Strength After Curing)/(Bond Strength Before Curing), expressed as a percentage. As described herein, the bond strength after curing measured for the reduction in bond strength is measured after 2 weeks of curing at a temperature of 85° C. and 85% relative humidity.

Additionally, the adhesive compositions described herein may reach a bond strength of 75 psi in less than 20, less than 18, less than 16, less than 12, less than 10, or less than 8 minutes of curing at room temperature.

In some embodiments, the bond strength of the adhesive composition described herein may be greater than about 90, at least about 95, at least about 100, at least about 110, at least about 120, at least about 130, at least about 140, at least about 150, at least about 160, at least about 170, at least about 180, at least about 190, at least about 200, at least about 210, at least about 220, at least about 230, at least about 240, at least about 250, at least about 260, at least about 270, at least about 280, at least about 290, or at least about 300 psi, measured after curing the adhesive at room temperature for 2 weeks and then heating to 82° C. for 30 minutes.

Further, in some embodiments, the adhesive compositions described herein are visually transparent or translucent, rather than opaque.

Additionally, in some embodiments, the adhesive composition can include a Zahn #2 viscosity of less than about 25 seconds, less than about 24 seconds, less than about 23, less than about 22, less than about 21, less than about 20, less than about 19, less than about 18, less than about 17, less than about 16, or less than about 15 seconds. The adhesive composition may also have a pot life of at least about 6, at least about 6.5, at least about 7, at least about 7.5, at least about 8, at least about 8.5, at least about 9, or at least about 9.5 hours.

According to embodiments of the present invention, there is provided a method of using the adhesive compositions described herein. The method comprises contacting a surface of at least one layer or substrate with at least a portion of an adhesive composition, then adhering another layer or substrate to the first via the adhesive layer. The adhesive composition used to form the adhesive layer may be any adhesive composition as described herein and can, in some cases, be a 1K or 2K adhesive composition.

Additionally, there is provided a laminated article formed from an adhesive described herein comprising a first substrate presenting a first surface, a second substrate presenting a second surface, and an adhesive layer disposed between and partially in contact with at least one of the first and second surfaces. Each of the first and second layers may comprise a material selected from the group consisting of polyethylene terephthalate, polypropylene, aluminum-coated or aluminum-laminated polyethylene terephthalate, low density polyethylene, and combinations thereof. In some cases, the first and second layers may be the same, while, in other embodiments, the first and second substrates or layers may be different (or formed from different materials).

In some embodiments, one or both of the first and second layers may have a thickness of at least about 0.5, at least about 1, at least about 1.5, or at least about 2 mil and/or not more than about 10, not more than about 8, not more than about 5, not more than about 3, not more than about 2, or not more than about 1.5 mil. The laminated article may further comprise a third, fourth, fifth, or even sixth layer, each separated from and in contact with, at least one additional adhesive layer, at least one of which is formed from an adhesive composition as described herein.

In some embodiments, the laminated article, or film, may be used to form another article such as, for example, a package, pouch, bag, or other type of container for holding and storing at least one substance, such as, for example, an edible item. The package, pouch, bag, or other container may then be filled with at least one substance, such as, for example, a foodstuff, beverage, or other edible substance, which can then be sealed within the interior volume of the package. As discussed previously, such a package may exhibit enhanced chemical and thermal resistance to delamination or other types of failure, due to the enhanced performance of the adhesive used to form the laminate.

In another embodiment, there is provided a laminated article comprising a first substrate presenting a first surface, a second substrate presenting a second surface, and an adhesive layer disposed between and in contact with at least a portion of the first and second surfaces. The substrates may be selected from the group consisting of polymers (including, but not limited to, polymeric foams and thicker or rigid polymeric substrates such as polycarbonate), wood, metal, fabric, leather, and combinations thereof. The first and second substrates may be formed from the same material or each may be formed from a different material.

In some embodiments, the first and second substrates may have different thicknesses such that, for example, one substrate is relatively thick (e.g., 0.25 inches or more), while the other is relative thin (e.g., not more than 30 mils). Such differences in thickness may occur when, for example, an adhesive composition is used to adhere an outer decorative or functional layer to a base substrate. In some cases, the ratio of the thickness of the thinner substrate to the thicker substrate can be at least about 0.0001:1, at least about 0.0005:1, at least about 0.001:1, at least about 0.005:1, at least about 0.01:1, at least about 0.05:1, at least about 0.1:1, at least about 0.5:1, or at least about 0.75:1.

Examples of suitable end use applications for adhesives as described herein can include, but are not limited to, woodworking, automotive, textile, appliances, electronics, bookbinding, and packaging.

It is contemplated that compositions useful in the invention can possess at least one of the Tg ranges described herein and at least one of the monomer ranges for the compositions described herein unless otherwise stated. It is also contemplated that compositions useful in the invention can possess at least one of the inherent viscosity ranges described herein, at least one of the Tg ranges described herein, and at least one of the monomer ranges for the compositions described herein, unless otherwise stated.

The following examples further illustrate how the polyesters in the invention can be made and evaluated, and how the polyurethane adhesives can be made and evaluated and are intended to be purely exemplary of the invention and are not intended to limit the scope thereof. Unless indicated otherwise, parts are parts by weight, temperature is in degrees C. (Celsius) or is at room temperature, and pressure is at or near atmospheric.

EXAMPLES

Example 1

A 12-L round bottom kettle with a four-neck lid was equipped with a mechanical stirrer, a thermocouple, a heated partial condenser (100° C.), a Dean-Stark trap, and a chilled condenser (15° C.). The kettle was charged with 2,2,4,4-tetramethylcyclobutane-1,3-diol (TMCD) (1890 g), diethylene glycol (DEG g), isophthalic acid (IPA) (2558 g), adipic acid (AD) (1098 g). The mixture was allowed to react under a nitrogen blanket. The temperature was increased from room temperature to 140° C. over 80 minutes. Once at 140° C., the temperature was then increased from 140 to 250° C. over 4 hours. Once the maximum temperature was reached, the acid catalyst, titanium isopropoxide (3.7 g), was added to reaction, vacuum of 28 torr was applied and the temperature was held until a low acid number was achieved. The polyester polyol was sampled for acid number and achieved an acid number of 1.6. Then, the polyester polyol was allowed to cool to 190° C. before being poured into aluminum pans to further cool and a solid product collected.

Several polyester polyols having various compositions were synthesized using the same procedure. The compositions of each of these polyols are listed in Table 1, where AD is adipic acid, IPA is isophthalic acid, DEG is diethylene glycol. All monomers are reported in mole %, where the diacids total 100 mole % and the diols total 100 mole %. Table 1 also lists the respective polyol properties, in which Mn is the number average molecular weight (g/mol), Mw is weight average molecular weight (g/mol), OHN is the hydroxyl number (mg KOH/g) and AN is the acid number (mg KOH/g).

TABLE 1

| Sample | AD (mol %) | IPA (mol %) | DEG (mol %) | TMCD (mol %) | OHN | AN | $M_n$ | $M_w$ |
|---|---|---|---|---|---|---|---|---|
| Polyol A1 | 33 | 67 | 79 | 21 | 21 | 3 | 5,700 | 13,000 |
| Polyol B1 | 58 | 42 | 79 | 21 | 19 | 2 | 4,800 | 14,000 |
| Polyol C1 | 33 | 67 | 50 | 50 | 20 | 1 | 6,600 | 16,000 |
| Polyol D1 | 58 | 42 | 50 | 50 | 17 | 0 | 6,600 | 16,000 |
| Polyol E1 | 45 | 55 | 65 | 35 | 19 | 0 | 6,300 | 15,000 |
| Polyol F1 | 58 | 42 | 75 | 25 | 18 | 2 | 7,100 | 17,000 |
| Polyol G1 | 58 | 42 | 60 | 40 | 19 | 1 | 6,000 | 16,000 |
| Polyol Z | 58 | 42 | 25 | 75 | 10 | 2 | 8,000 | 22,000 |

Example 2

A 12-L round bottom kettle with a four-neck lid was equipped with a mechanical stirrer, a thermocouple, a heated partial condenser (100° C.), a Dean-Stark trap, and a chilled condenser (15° C.). The kettle was charged with 2,2,4,4-tetramethylcyclobutane-1,3-diol (TMCD) (1890 g), diethylene glycol (DEG g), isophthalic acid (IPA) (2558 g), adipic acid (AD) (1098 g). The mixture was allowed to react under a nitrogen blanket. The temperature was increased from room temperature to 140° C. over 80 minutes. Once at 140° C., the temperature was increased from 140 to 250° C. over 4 hours. Then the acid catalyst, titanium isopropoxide (3.7 g), was added to reaction, vacuum of 28 torr was applied and the temperature held until the polyol had an acid number of 1.6. The resulting polyester polyol was allowed to cool to 190° C. before being poured into aluminum pans, wherein it was further cooled and collected as a solid product.

Several polyester polyols having various compositions were synthesized using the same procedure. The compositions of each of these polyols are listed in Table 2, where AD is adipic acid, IPA is isophthalic acid, DEG is diethylene glycol. All monomers are reported in mol %, where the diacids total 100% and the diols total 100%. Table 2 also lists glass transition temperature ($T_g$) and the hydroxyl number (OHN) of the respective polyols.

Glass transition temperature was determined using a TA Instruments Q2000 Differential Scanning calorimeter with the RCS-90 cooler and purged with 50 mL/min N2. The sample was cooled to −55° C. then heated at 20° C./min to 205° C. It then equilibrated at 200° C. and held isothermally for 2 minutes. The sample was then cooled again to −55° C. at 20° C./min then equilibrated at −50° C. and held isothermally for 30 seconds. Finally, the sample was heated again at 20° C./min to 205° C.

Viscosity was determined using a Brookfield DV-1+viscometer that used a S28 spindle and ran at 100 rpm with 13.6% torque.

TABLE 2

| Polyol | AD (mol %) | IPA (mol %) | DEG (mol %) | TMCD (mol %) | OHN | $T_g$ (° C.) | Weight % Solids | Viscosity 25° C. (cP) |
|---|---|---|---|---|---|---|---|---|
| Polyol-A1 | 33 | 67 | 79 | 21 | 21 | −5 | — | — |
| Polyol-B1 | 58 | 42 | 79 | 21 | 19 | −23 | — | — |
| Polyol-C1 | 33 | 67 | 50 | 50 | 21 | 11 | — | — |
| Polyol-C2 | 33 | 67 | 50 | 50 | 20 | 13 | 60 | 700 |
| Polyol-D1 | 58 | 42 | 50 | 50 | 17 | −8 | — | — |
| Polyol-E1 | 45 | 55 | 65 | 35 | 19 | −7 | — | — |
| Polyol-F1 | 58 | 42 | 75 | 25 | 18 | −20 | — | — |
| Polyol-G1 | 58 | 42 | 60 | 40 | 19 | −15 | — | — |
| Polyol-Z | 58 | 42 | 25 | 75 | 10 | 4 | — | — |
| Polyol-C4 | 33 | 67 | 50 | 50 | 63 | −3 | — | — |
| Polyol-C5 | 33 | 67 | 50 | 50 | 102 | −16 | — | — |
| Polyol-A2 | 33 | 67 | 79 | 21 | 19 | −4 | — | — |
| Polyol-D2 | 58 | 42 | 50 | 50 | 20 | −8 | — | — |
| Polyol-C3 | 33 | 67 | 50 | 50 | 21 | 10 | — | — |

Example 3

Polyol-A2 described in Example 2 was weighed into an 8 oz glass jars that has a Teflon lid with Urethane Grade Ethyl Acetate, making a polyol solution of 60 wt % solids. The jar was closed and sealed with electrical tape and rolled over night to allow for complete mixing. When ready to coat, the polyol solution, the hardener, ethyl acetate, and an adhesion promoter was combined into another 8 oz glass jar and rolled to mix, making an adhesive formulation with 40 wt % solids and an isocyanate/OH index of 2.

The adhesive formulation was coated onto PET1 using a TMI Automatic Drawdown Machine, Model KCC-101 and a Meyer rod #1 at 30 ft/min. The coated PET1 was placed in an oven at 65° C. for 1 minute. The second film, CPP, after treated by a corona treater at a watt density of 10 KWf²/m, is then placed on top of the coated PET1, and the structure is laminated using a laminator (Scotch® TL806 Smart Thermal Laminator, Office Depot). This results in a laminated film with a (dry) coat weight of about 4 gsm (grams per square meter). See Table 3, below, for further details on the types of substrates.

Polyol-A1, pre-diluted with Urethane Grade Ethyl Acetate to 60 wt % solids, was poured into a plastic bucket. HDI trimer, pre-diluted with Urethane Grade Ethyl Acetate to 20 wt % solids, ethyl acetate, and additional components, such as an adhesion promoter, were poured into the same bucket, and mixed into an adhesive formulation of 39 wt % solids. It had an isocyanate/OH index of 2 and a Zahn #2 viscosity of 22 seconds.

The adhesive formulation was then poured into the gravure pan of a Faustel LabMaster pilot line laminator. The adhesive formulation was coated onto PET-Al with a gravure coating roll of 120 LPI/15 BCM at a line speed of 50 ft/min. The coated PET-Al was then sent through a 10 ft dryer, heated to 175° F. After the coated PET-Al leaves the dryer, CPP pretreated by corona, was placed on top of the coated PET-Al and put through a laminating roll heated to 170° F. and under 65 psi of pressure.

Next the viscosity of the adhesive compositions was measured with a #2 Zahn cup according to ASTM D4212 "Standard Test Method for Viscosity by Dip-Type Viscosity Cups." Table 3 below summarizes specifics regarding each of the tested substrates, monomers, and hardeners. Tables 4 and 5 below summarize the results of testing of the above adhesive compositions.

TABLE 3

| | Flexible Substrates (Films): |
|---|---|
| PET1 | Polyethylene terephthalate, 1 mil (Mitsubishi), surface treated by supplier, used for hand laminations |
| PET2 | Polyethylene terephthalate, 1 mil (Neologic Solutions), corona treated prior to use, used for machine laminations |
| CPP1 | Cast polypropylene, 2 mil (Neologic), corona treated prior to use, used for hand laminations |
| CPP2 | Cast polypropylene, 2 mil (Berry), corona treated prior to use, used for machine laminations |
| PET-Al | Al foil/PET laminate, 32 micron (Neologic solutions), corona treated prior to use, used for machine laminations |
| LDPE | Low density polyethylene, 1.5 mil (Berry), corona treated prior to use, used for machine laminations |
| | Monomers: |
| AD | adipic acid |
| IPA | isophthalic acid |
| TMCD | 2,2,4,4-tetramethyl-1,3-cyclobutanediol |
| DEG | diethylene glycol |
| | Isocyanate Hardeners: |
| HDI Trimer | hexamethylene diisocyanate trimer |
| IPDI Trimer | isophorone diisocyanate trimer |

TABLE 4

| Polyol | AD (mol %) | IPA (mol %) | DEG (mol %) | TMCD (mol %) | EG (mol %) | OHN | AN | $M_n$ | $M_w$ | $T_g$ (° C.) |
|---|---|---|---|---|---|---|---|---|---|---|
| Polyol-A1 | 33 | 67 | 79 | 21 | 0 | 21 | 3 | 5,700 | 13,000 | −5 |
| Polyol-B1 | 58 | 42 | 79 | 21 | 0 | 19 | 2 | 4,800 | 14,000 | −23 |
| Polyol-C1 | 33 | 67 | 50 | 50 | 0 | 21 | 2 | 5,600 | 13,000 | 11 |
| Polyol-C2 | 33 | 67 | 50 | 50 | 0 | 20 | 2 | 6,600 | 16,000 | 13 |
| Polyol-D1 | 58 | 42 | 50 | 50 | 0 | 17 | 0 | 6,600 | 16,000 | −8 |
| Polyol-E1 | 45 | 55 | 65 | 35 | 0 | 19 | 0 | 6,300 | 15,000 | −7 |
| Polyol-F1 | 58 | 42 | 75 | 25 | 0 | 18 | 2 | 7,100 | 17,000 | −20 |
| Polyol-G1 | 58 | 42 | 60 | 40 | 0 | 19 | 1 | 6,000 | 16,000 | −15 |
| Polyol-Z | 58 | 42 | 25 | 75 | 0 | 10 | 2 | 8,000 | 22,000 | 4 |
| Polyol-A2 | 33 | 67 | 79 | 21 | 0 | 19 | 0 | 4,500 | 13,000 | −4 |
| Polyol-D2 | 58 | 42 | 50 | 50 | 0 | 20 | 0 | 6,600 | 16,000 | −8 |
| Polyol-C3 | 33 | 67 | 50 | 50 | 0 | 21 | 1 | 6,200 | 15,000 | 10 |
| Control-H | 58 | 42 | 25 | 0 | 75 | 24 | 1 | 4,000 | 11,000 | −21 |
| Control-2 | 29 | 71 | 69 | 0 | 31 | 17 | 1 | 5,500 | 15,500 | −6 |

TABLE 5

| Polyol Descriptor | Isocyanate Hardener | Final wt % Solids | Zahn # 2 Cup (sec) | Coat Weight (gsm) | Isocyanate Index | Substrate Type | Lamination Coating Method |
|---|---|---|---|---|---|---|---|
| Control-H | HDI Trimer | 40 | 24 | 4.0 | 2 | PET-Al/CPP2 | Machine |
| Control-2 | HDI Trimer | 37 | 22. | 3.7 | 2 | PET-Al/CPP2 | Machine |
| Polyol-B1 | HDI Trimer | 41 | 22 | 4.2 | 2 | PET-Al/CPP2 | Machine |
| Polyol-F1 | HDI Trimer | 36 | 22 | 3.7 | 2 | PET-Al/CPP2 | Machine |
| Polyol-G1 | HDI Trimer | 41 | 21 | 4.2 | 2 | PET-Al/CPP2 | Machine |

TABLE 5-continued

| Polyol Descriptor | Isocyanate Hardener | Final wt % Solids | Zahn # 2 Cup (sec) | Coat Weight (gsm) | Isocyanate Index | Substrate Type | Lamination Coating Method |
|---|---|---|---|---|---|---|---|
| Polyol-D1 | HDI Trimer | 41 | 23 | 4.4 | 2 | PET-Al/CPP2 | Machine |
| Polyol-Z | HDI Trimer | 36 | 22 | 3.7 | 2 | PET-Al/CPP2 | Machine |
| Polyol-A1 | HDI Trimer | 39 | 22 | 3.6 | 2 | PET-Al/CPP2 | Machine |
| Polyol-C1 | HDI Trimer | 38 | 22 | 4.1 | 2 | PET-Al/CPP2 | Machine |
| Polyol-C2 | HDI Trimer | 38 | 21 | 4.2 | 2 | PET-Al/CPP2 | Machine |
| Polyol-C2 | HDI Trimer | 38 | 21 | 4.2 | 2 | PET2/CPP2 | Machine |
| Polyol-C2 | HDI Trimer | 38 | 21 | 4.3 | 2 | PET-Al/LDPE | Machine |
| Polyol-C2 | HDI Trimer | 38 | 21 | 4.0 | 2 | PET2/LDPE | Machine |
| Polyol-A2 | HDI Trimer | 40 | — | 4.0 | 1.4 | PET1/CPP1 | Hand |
| Polyol-A2 | IPDI Trimer | 40 | — | 4.0 | 1.4 | PET1/CPP1 | Hand |
| Polyol-A2 | HDI Trimer | 40 | — | 4.0 | 2 | PET1/CPP1 | Hand |
| Polyol-D2 | HDI Trimer | 40 | — | 4.0 | 1.4 | PET1/CPP1 | Hand |
| Polyol-D2 | IPDI Trimer | 40 | — | 4.0 | 1.4 | PET1/CPP1 | Hand |
| Polyol-D2 | HDI Trimer | 40 | — | 4.0 | 2 | PET1/CPP1 | Hand |
| Polyol-C3 | HDI Trimer | 40 | — | 4.0 | 1.4 | PET1/CPP1 | Hand |
| Polyol-C3 | HDI Trimer | 40 | — | 4.0 | 2.0 | PET1/CPP1 | Hand |

Example 4

Several adhesives were formulated with various polyols as described in Example 3. The offline peel strength for each was tested according to the following procedure. T-peel testing was done according to ASTM F904-16 "Standard Test Method for Comparison of Bond Strength or Ply Adhesion of Similar Laminates Made from Flexible Materials" using an MTS Criterion Model 42, 100 Newton load-cell. The samples were cured at 50° C. for either 24 hours, 1 week or 2 weeks before testing. A film direction of the coating direction was used. The film was separated by a t-peel test in the direction of the coating. A minimum of three samples of each composition were tested and the average and standard deviation reported. Off-line peel strength was measured by taking laminated samples directly off the laminator (0-5 min after lamination) for T-peel testing.

Table 6, below, summarizes the offline peel strength test for adhesives formed with polyester polyols having increasing amounts of TMCD. The laminates were all machine laminated between PET-Al and CPP2. The adhesive had an isocyanate index of 2.

TABLE 6

| Polyol | Mol % TMCD* | Isocyanate Hardener | Offline Peel Strength (g/in) | Standard Deviation (g/in) | Failure Mechanism |
|---|---|---|---|---|---|
| Control-H | 0 | HDI Trimer | 53 | — | Cohesive |
| Polyol-B1 | 10.5 | HDI Trimer | 25 | — | Cohesive |
| Polyol-F1 | 12.5 | HDI Trimer | 31 | — | Cohesive |
| Polyol-G1 | 20 | HDI Trimer | 23 | — | Cohesive |
| Polyol-D1 | 25 | HDI Trimer | 92 | — | Cohesive |
| Polyol-Z | 37.5 | HDI Trimer | 492 | 22 | Cohesive |

*This is the mole % TMCD considering both diacids and diols

Table 7, below, summarizes the results of a 24 hour bond strength test for adhesives formed with polyester polyols having increasing amounts of TMCD. The laminates were all machine laminated between PET-Al and CPP2. The adhesives had an isocyanate index of 2.

TABLE 7

| Polyol | Mol % TMCD* | Isocyanate Hardener | 24 hr Peel Strength (g/in) | Standard Deviation (g/in) | Failure Mechanism |
|---|---|---|---|---|---|
| Control-H | 0 | HDI Trimer | 409 | — | Cohesive |
| Polyol-B1 | 10.5 | HDI Trimer | 505 | — | Cohesive |
| Polyol-F1 | 12.5 | HDI Trimer | 236 | — | Cohesive |
| Polyol-G1 | 20 | HDI Trimer | 288 | — | Cohesive |
| Polyol-D1 | 25 | HDI Trimer | 696 | — | Cohesive |
| Polyol-Z | 37.5 | HDI Trimer | 2952 | 273 | Substrate |

*This is the mole % TMCD considering both diacids and diols

Table 8, below, summaries the impact that the Tg of the polyol has on the offline peel strength of the adhesive. All samples were machine laminated between PET-Al and CPP2 using an adhesive composition with an isocyanate index of 2.

TABLE 8

| Polyol | $T_g$ (° C.) | Isocyanate Hardener | Offline Peel Strength (g/in) | Standard Deviation (g/in) | Failure Mechanism |
|---|---|---|---|---|---|
| Control-H | −21 | HDI Trimer | 53 | — | Cohesive |
| Polyol-B1 | −23 | HDI Trimer | 25 | — | Cohesive |
| Polyol-A1 | −5 | HDI Trimer | 212 | — | Cohesive |
| Polyol-Z | 4 | HDI Trimer | 492 | 22 | Cohesive |
| Polyol-C1 | 11 | HDI Trimer | 528 | — | Cohesive |

Table 9, below, summaries the impact that the Tg of the polyol has on the 24 hour peel strength of the adhesive. All samples were machine laminated between PET-Al and CPP2 using an adhesive composition with an isocyanate index of 2.

TABLE 9

| Polyol | $T_g$ (° C.) | Isocyanate Hardener | 24 hr Peel Strength (g/in) | Standard Deviation (g/in) | Failure Mechanism |
|---|---|---|---|---|---|
| Control-H | −21 | HDI Trimer | 409 | — | Cohesive |
| Polyol-B1 | −23 | HDI Trimer | 505 | — | Cohesive |
| Polyol-A1 | −5 | HDI Trimer | 792 | — | Elongation |
| Polyol-Z | 4 | HDI Trimer | 2,952 | 273 | Substrate |
| Polyol-C1 | 11 | HDI Trimer | 2,084 | — | Substrate |

Table 10 summarizes the time until Substrate Failure of several machine laminated articles between PET-Al and CPP2, and Table 11 summarizes data for several other substrates. Substrate failure was determined by visual inspection of the article after peel testing. Control-H failed via the adhesive layer and did not exhibit any substrate failure.

TABLE 10

| Polyol | Isocyanate Hardener | Cure Time until Substrate Failure |
|---|---|---|
| Control-H | HDI Trimer | Did not achieve |
| Polyol-A1 | HDI Trimer | 1 week |
| Polyol-C1 | HDI Trimer | 24-hours |
| Polyol-Z | HDI Trimer | 24-hours |

TABLE 11

| Polyol | Iso-cyanate Hardener | Sub-strate Type | 24 hr Peel Strength (g/in) | Standard Deviation (g/in) | Failure Mechanism |
|---|---|---|---|---|---|
| Polyol-C2 | HDI Trimer | PET-Al/CPP2 | 2405 | 210 | Substrate |
| Polyol-C2 | HDI Trimer | PET2/CPP2 | 2676 | 152 | Substrate |
| Polyol-C2 | HDI Trimer | PET-Al/LDPE | 1202 | 56 | Substrate |
| Polyol-C2 | HDI Trimer | PET2/LDPE | 1175 | 283 | Substrate |

Table 12 summarizes the results of a Two-Week Peel Strength test for several adhesive compositions including an HDI Trimer. All samples were hand Laminated between PET1 and CPP1, with the adhesive having an isocyanate index of 1.4.

TABLE 12

| Polyol | Iso-cyanate Hardener | Iso-cyanate Index | 1 Week Peel Strength (g/in) | Standard Deviation (g/in) | Failure Mechanism |
|---|---|---|---|---|---|
| Polyol-C3 | HDI Trimer | 1.4 | 1084 | 337 | Substrate |
| Polyol-C3 | HDI Trimer | 2.0 | 945 | 260 | Substrate |
| Polyol-D2 | HDI Trimer | 1.4 | 940 | 82 | Substrate |
| Polyol-D2 | HDI Trimer | 2.0 | 892 | 88 | Substrate |

Table 13 is a summary of Two-Week Peel Strength test with adhesives formed with IPDI Trimer and HDI Trimer as the isocyanate components. All samples were hand Laminated between PET1 and CPP1. The adhesive had an isocyanate Index of 1.4.

TABLE 13

| Polyol | Iso-cyanate Hardener | Two Week Peel Strength (g/in) | Standard Deviation (g/in) | Failure Mechanism |
|---|---|---|---|---|
| Polyol-A2 | HDI Trimer | 857 | 44 | Substrate |
| Polyol-A2 | IPDI Trimer | 927 | 56 | Substrate |
| Polyol-D2 | HDI Trimer | 806 | 14 | Substrate |
| Polyol-D2 | IPDI Trimer | 736 | 134 | Substrate |

Example 5

Several adhesive compositions were formed as discussed above. Then, laminates were formed using the adhesive composition and then sealed to form pouches. To form a pouch, a 9"×12" (23 cm×30.5 cm) sheet of laminate was folded over to give a double layer of about 9"×6" (23 cm×15.25 cm) such that the polyethylene or polypropylene film of one layer was in contact with the polyethylene or polypropylene film of the other layer. The inner film layer was either be polyethylene or polypropylene. PET2 and PET-Al were used as the outer film layer. The edges were trimmed on a paper cutter to give a folded piece about 5"×7" (12.7 cm×17.8 cm). Two long sides and one short side were heat sealed at the edges to give a finished pouch with an interior size of 4"×6" (10.2 cm×15.2 cm). The heat sealing was then carried out at 177° C. (350° F.) for one second at a hydraulic pressure of 276 kPa (40 psi).

The chemical resistance of each pouch was tested according to the following procedure. The pouches were filled through the open side with 100±5 ml of "1:1:1 sauce" (blend of equal parts by weight of ketchup, vinegar, and vegetable oil). During filling, splashing the sauce onto the heat seal area was avoided as this can cause the heat seal to fail during the testing. After filling, the top of the pouch was sealed in a manner that minimizes air entrapment inside of the pouch. The pouches were then held at 100° C. (boiling in water) for 1 hour. The food simulant was removed by cutting one side of the sealed pouch. The contents were dumped out and the pouch rinsed with deionized water. Strips were cut out of the pouch (3"×1") to be tested for Peel Strength. Peel strength was tested within 0.5 hours after the pouch was removed from the heated bath and was performed as described in Example 4.

Table 14 below summarizes the results of chemical resistance Testing with a 1:1:1 food simulant. All samples were machine laminated between PET-Al and CPP2.

TABLE 14

| Polyol Descriptor | Iso-cyanate Hardener | Peel Strength on PET-Al/CPP (g/in) | Standard Deviation (g/in) | Failure Mechanism |
|---|---|---|---|---|
| Control-2 | HDI Trimer | 81 | 11 | Adhesive |
| Polyol-A1 | HDI Trimer | 636 | 237 | Cohesive/Partial Substrate |
| Polyol-C1 | HDI Trimer | 738 | 144 | Cohesive/Partial Substrate |

Table 15 summarizes the results of additional chemical resistance testing performed as above, but with 50 wt % ethyl alcohol in the pouch. All samples were machine laminated between PET-Al and CPP2.

TABLE 15

| Polyol Descriptor | Iso-cyanate Hardener | Peel Strength on PET-Al/CPP (g/in) | Standard Deviation (g/in) | Failure Mechanism |
|---|---|---|---|---|
| Control-2 | HDI Trimer | 15 | 1 | Cohesive |
| Polyol-A1 | HDI Trimer | 576 | 41 | Cohesive |
| Polyol-C1 | HDI Trimer | 508 | 56 | Cohesive |

Example 6

Several adhesive compositions were formed as discussed above. Then, laminates were formed and tested for thermal resistance according to the following procedure.

T-peel testing was done as described in Example 3 except with a Thermocraft Lab-Temp Heating Chamber set to 90° C. The sample was put into the grips of the MTS Criterion Model 42 instrument and then enclosed in the heating chamber. It was equilibrated at the elevated temperature for 2 minutes. Keeping the sample in the heating chamber, the sample was pulled in the direction of the coating. A minimum of three samples of each composition were tested and the average and standard deviation reported Table 16 below summarizes the results of thermal resistance bond strength testing for several adhesives. All samples were machine laminated between PET-Al and CPP2.

TABLE 16

| Polyol | Isocyanate Hardener | Peel Strength on PET-Al/CPP (g/in) | Standard Deviation (g/in) | Failure Mechanism |
|---|---|---|---|---|
| Control-2 | HDI Trimer | 182 | 8 | Adhesive |
| Polyol-A1 | HDI Trimer | 306 | 26 | Cohesive |
| Polyol-C1 | HDI Trimer | 320 | 17 | Adhesive |

Example 7

A 12 L round bottom flask sitting in a heating mantle was fitted with a stir shaft, a thermal couple, a nitrogen inlet, and a condenser. The condenser was maintained at 100-105° C. using a circulation bath. The volatiles coming out of the first condenser was condensed with a cold water chilled condenser then collected in a graduated cylinder. The flask was kept under a nitrogen blanket throughout the reaction. An amount of 3374 g 2,2,4,4-tetramethyl-1,3-cyclobutanediol, 2652 g 1,4-cyclohexanedicarboxylic acid (65% cis), 672 g adipic acid, and 6.6 g FASCAT® 4102 were charged into the flask. The mixture was then heated to 240° C. and maintained at such temperature till the condensate stopped coming out. Another 6.6 gram of FASCAT® 4102 was then added to the reaction. The mixture was then subjected to a vacuum of 20 torr until the acid number was around 2.0 mgKOH/g. The product was then poured into an aluminum pan, cooled to room temperature.

Next, a 2-L kettle reactor with a four-neck lid was equipped with a mechanical stirrer, a thermocouple, a heated partial condenser (115° C.), a Dean-Stark trap, and a chilled condenser (15° C.). Hexahydrophthalic anhydride (HHPA) (817.8 g) and TMCD (559.9 g) were added to the reactor. The mixture was slowly heated to 150° C. The reaction was exothermic and reached ca. 180° C. When the exotherm was complete, the temperature was set to 215° C. and ca. 20 mL of water was taken off. To the reaction mixture was added neopentyl glycol (217.7 g) and Fascat 4100 (1.5 g). The temperature was slowly increased to 230° C. When the acid number was less than 2 mgKOH/g, the reaction was stopped and the polyester polyol was poured out.

Several polyester polyol resins were synthesized according to this method. The compositions of each of these polyester polyols are listed in Table 17 and 18, and the polyester polyol properties are listed in Table 19, in which CHDA is 1,4-cyclohexanedicarboxylic acid, IPA is isophthalic acid, HHPA is hexahydrophthalic anhydride, CHDM is 1,4-cyclohexanedimethanol, NPG is neopentyl glycol, and TMP is trimethylolpropane.

TABLE 17

| Polyol | CHDA | Adipic acid | IPA | HHPA |
|---|---|---|---|---|
| Polyol K | 2652 | 672 | | |
| Polyol L | 2651.6 | 672.24 | | |
| Polyol M | 2754.9 | 584.56 | | |
| Polyol N | | | | 817.83 |
| Polyol O | | | | 809.42 |
| Polyol P | | | | 772.59 |
| Polyol Q | | | | 772.59 |
| Polyol R | | | | 15945 |
| Polyol S | | | 319.97 | |
| Polyol T | | | 315.67 | |

TABLE 18

| Polyol | TMCD | CHDM | NPG | TMP | BDO |
|---|---|---|---|---|---|
| Polyol K | 3374 | | | | |
| Polyol L | 3273.3 | 100.94 | | | |
| Polyol M | 3175.1 | 98.2 | | | |
| Polyol N | 559.92 | | 217.74 | | |
| Polyol O | 632.76 | | 152.33 | | |
| Polyol P | 329.27 | 493.9 | | | |
| Polyol Q | 416.74 | 408.57 | | | |
| Polyol R | 8426.6 | 6997.7 | | 444.06 | |
| Polyol S | | 64.17 | 185.34 | | |
| Polyol T | 66.86 | | 193.14 | | |

TABLE 19

| Polyol | OHN, mgKOH/g | AN, mgKOH/g | Tg, ° C. | Melt viscosity at 130° C., Pa·s | Mn | Mw |
|---|---|---|---|---|---|---|
| Dynacoll 7150 | 41 | 1 | 50 | 68 | | |
| Dynacoll 7130 | 36 | 1 | 28 | 10 | | |
| Polyol K | 41 | 2 | 48 | 36 | 3441 | 7297 |
| Polyol L | 35 | 2 | 46 | 73 | 4065 | 8918 |
| Polyol M | 37 | 2 | 49 | 70 | 3626 | 7831 |
| Polyol N | 31 | 2 | 57 | 37 | 2961 | 6868 |
| Polyol O | 25 | 4 | 63 | 80 | 2501 | 6442 |
| Polyol P | 25 | 2 | 53 | 51 | 3700 | 8115 |
| Polyol Q | 43 | 1 | 52 | 25 | 2501 | 5834 |
| Polyol R | 33 | 3 | 58 | 59 | 3373 | 8764 |
| Polyol S | 45 | 3 | 52 | 74 | 2839 | 5764 |
| Polyol T | 46 | 3 | 55 | 54 | 2574 | 2394 |

Example 5

Several urethane prepolymers were synthesized according to the following general procedure. A 1-Liter kettle reactor with a four-neck lid was equipped with a heating mantle, a mechanical stirrer, a thermocouple, a chilled condenser, nitrogen inlet and bubbler. To the reactor was charged, 125 g Dow Voranol 2120, 100 g Evonik Dynacoll 7360, 50 g Evonik Dynacoll 7380, 125 g Evonik Dynacoll 7250, 70.8 g Evonik Vestplast 508, 35.4 g Lubrizol Pearlbond 521, and 100 grams of a polyester polyol (a TMCD polyester polyol or a control polyol). The mixture was heated to 120° C. and mixed before being dried at the same temperature under high vacuum for at least 2 hours. After cooling down to 90° C., the amount of 4,4'-MDI as listed in Table 20 was charged in one portion. The mixture was then stirred at 95° C. under high vacuum for 2 hours. The mixture was heated to 120° C., 0.7 g 2,2'-dimorpholinildiethylether was charged then the product was degassed for 0.5 hours. Finally, the prepolymer was stored in sealed metal cans at room temperature.

TABLE 20

| Prepolymer | Polyol | MDI, g | Prepolymer appearance |
|---|---|---|---|
| C-1 | Dynacoll 7150 | 74.45 | opaque |
| C-2 | Dynacoll 7130 | 71.82 | opaque |
| A | Polyol K | 75.06 | translucent |
| B | Polyol L | 71.62 | translucent |
| C | Polyol M | 72.42 | translucent |
| D | Polyol N | 70.00 | translucent |
| E | Polyol O | 68.78 | translucent |
| F | Polyol P | 68.38 | translucent |
| G | Polyol Q | 74.45 | translucent |
| H | Polyol R | 70.81 | translucent |
| I | Polyol S | 75.66 | opaque |
| J | Polyol T | 76.07 | opaque |

Several properties of the adhesive compositions were tested as described below. Open time was measured according to the following procedure. The prepolymer was heated up to 140° C. then applied onto silicon paper as a 500 microns thick film. Strips of paper were pressed onto the film at certain intervals. When the film became tack-free, the paper strips were removed. The open time was determined by the time when no fibers were torn apart from the paper.

Setting time was measured according to the following procedure. A shear module was prepared with a bonding area of 25 mm by 25 mm. After fixing the upper end in a single location, a 1 kg-weight was hung at the bottom of the module, and the time for the module to stop moving was determined as the settling time.

The softening point of the adhesive was determined by ring and ball method ASTM D6493-11) (2015).

The melt viscosity of the adhesives was measured using a Brookfield Thermosel, RVDV-1 Prime. Shear strength was measured as follows: A shear module was prepared having a bonding area of 25 mm by 25 mm. Adhesive was cured at room temperature using prescribed conditions. The testing machine conformed to requirements of and have the capabilities of the machine prescribed in ASTM D1002. At least three lap shear samples were prepared tested.

Green strength for several of the adhesives was measured as follows. A shear module was prepared with a bonding area of 25 mm by 25 mm. Immediately applied 500 g weight on top of the bonding area for 30 seconds. The shear strength was then measured at 1 min, 2 min, 5 min, 10 min, and 15 min after the start of the compression. At least three lap shear samples were prepared in each case and measured.

Tables 21 through 25 summarizes the evaluation of the adhesive compositions based on TMCD polyester polyols of the above properties. Table 21 shows the results of several of the above tests, while Table 22 summarizes the green strength at various times. Table 23 summarizes the results after a 2-week cure, and Table 24 shows the bond strength of two-week cured samples which were then heated to 82° C. for 30 minutes before being tested (to illustrate heat resistance). Finally, Table 25 shows tensile strength and percent elongation of several samples.

TABLE 21

| Prepolymer | Set Time, s | Open Time, s | Softening point, ° C. | Viscosity at 120° C., Pa · s |
|---|---|---|---|---|
| C-1 | 50 | 35 | | 15 |
| C-2 | 35 | 35 | 65 | 29.8 |
| A | 50 | 35 | | 9.4 |
| B | 85 | 60 | 71 | 9.3 |
| D | 60 | 35 | 72 | 7.6 |
| E | 75 | 15 | 74 | 16.4 |
| F | 90 | 55 | 75 | 7.4 |
| G | 110 | 70 | 72 | 6.6 |
| H | 80 | 35 | 72 | 9.7 |
| I | | | 64 | 19.9 |
| J | | | 66 | 15 |

TABLE 22

| Prepolymer | 1 min | 2 min | 5 min | 10 min | 15 min |
|---|---|---|---|---|---|
| C-1 | 3 | 16 | 49 | 67 | 68 |
| C-2 | 5 | 27 | 62 | 68 | |
| A | 4 | 31 | 76 | 84 | |
| B | 1 | 17 | 77 | 84 | |
| D | 2 | 39 | 77 | 82 | 100 |
| E | 1 | 29 | 79 | 85.0 | |
| F | 1 | 5 | 69 | 83 | |
| G | 1 | 4 | 64 | 74 | |
| H | 1 | 29 | 84 | 88 | |

TABLE 23

| Prepolymer | Beech, psi | Aluminum, psi | PP (untreated), psi | PVC, psi |
|---|---|---|---|---|
| C-1 | 156.8 | 160.9 | 44.4 | 355.7 |
| A | 355.8 | 177.5 | 54.3 | 335.8 |
| D | 290.1 | 178.9 | 157 | 260.4 |
| F | 360.9 | 153.5 | 61.3 | 274.6 |
| H | 308.9 | 166.3 | 55.2 | 222.1 |

TABLE 24

| Prepolymer | Beech, psi | Aluminum, psi | PP (untreated), psi | PVC, psi |
|---|---|---|---|---|
| C-1 | 16.5 | 13.5 | 2.9 | 24.8 |
| A | 64.4 | 20.9 | 5.2 | 34.2 |
| D | 58.1 | 19.0 | 10.1 | 25.9 |
| F | 24.4 | 7.7 | 3.5 | 15.2 |
| H | 57.5 | 13.2 | 3.1 | 23.3 |

TABLE 25

| Prepolymer | Tensile strength, psi | Elongation % |
|---|---|---|
| C-1 | 1833 | 846% |
| C-2 | 1550 | 1120% |
| A | 1966 | 690% |
| B | 2297 | 842% |
| D | 1448 | 739% |
| E | 1177 | 712% |
| F | 1451 | 760% |
| G | 2412 | 856% |
| H | 2565 | 782% |
| I | 1907 | 920% |

What is claimed is:

1. A hot melt adhesive composition, said adhesive composition comprising:
    an isocyanate-terminated polyurethane prepolymer comprising residues of (i) at least one polyester polyol comprising a diol component having residues of 2,2,4,4-tetraalkyl-1,3-cyclobutanediol (TACD), wherein the at least one polyester polyol has a glass transition temperature (Tg) of −30 to 80° C., and (ii) at least one isocyanate,
    wherein said adhesive composition has a solids content of at least 95 percent, based on the total weight of the composition.

2. The adhesive composition of claim 1, wherein said polyester polyol has a glass transition temperature (Tg) of 0 to 80° C., a hydroxyl number of 5 to 200 mg KOH/g, an acid number of 0 to 10 mg KOH/g, and a number average molecular weight of 500 to 10,000 g/mole.

3. The adhesive composition of claim 1, wherein said adhesive composition is a two-part adhesive composition.

4. The adhesive composition of claim 1, wherein said adhesive composition is a one-part, moisture curable adhesive composition.

5. The adhesive composition of claim 1, wherein said diol component of said polyester polyol comprise residues of at least one diol selected from the group consisting of 2,2-dimethyl-1,3-propanediol (neopentyl glycol), 1,2-cyclohexanedimethanol, 1,3-cyclohexanedimethanol, 1,4-cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 1,4-butanediol, 1,3-propanediol, 1,2-propanediol, ethylene glycol, diethylene glycol, pentanediol, dodecandiol, and 1,6-hexanediol.

6. The adhesive composition of claim 1, wherein said polyester polyol comprises an acid component having residues of at least one dicarboxyl monomer selected from the group consisting of isophthalic acid or esters thereof, terephthalic acid or esters thereof, phthalic acid or esters thereof, phthalic anhydride, 1,4-cyclohexane-dicarboxylic acid, 1,3-cyclohexanedicarboxylic acid, hexahydrophthalic anhydride, tetrahydrophthalic anhydride, dodecanedioic acid, sebacic acid, azelaic acid, maleic acid or anhydride, fumaric acid, succinic anhydride, succinic acid, adipic acid, dimer acid, hydrogenated dimer acid, 2,6-naphthalenedicarboxylic acid, glutaric acid, and itaconic acid.

7. The adhesive composition of claim 1, wherein said polyester polyol comprises residues of at least one diol selected from the group consisting of 1,4-cyclohexanedimethanol, 1,4-butanediol, 1,3-propanediol, diethylene glycol, and 1,6-hexanediol, pentanediol, dodecandiol, and combinations thereof.

8. The adhesive composition of claim 1, wherein said diol component of said polyester polyol comprises residues of at least one diol selected from the group consisting of diethylene glycol, 1,4-cyclohexanedimethanol, neopentyl glycol, and combinations thereof, and wherein said at least one diol is present in an amount of at least 3 mole percent, based on the total moles of said diol component and/or wherein said polyester polyol comprises an acid component having residues of at least one dicarboxyl monomer selected from the group consisting of 1,4-cyclohexanedicarboxylic acid, adipic acid, isophthalic acid, hexahydrophthalic anhydride, and combinations thereof.

9. The adhesive composition of claim 1, wherein said polyester polyol has a Tg of from 10 to 80° C., a hydroxyl number of not more than 50 mg KOH/g, a number average molecular weight of 500 to 10,000, and a hydroxyl functionality of less than 2.1.

10. The adhesive composition of claim 1, wherein said polyester polyol comprises an acid component having 5 to 100 mole percent of residues of a dicarboxyl monomer selected from the group consisting of 1,4-cyclohexanedicarboxylic acid, adipic acid, isophthalic acid, and hexahydrophthalic anhydride, based on the total moles of said acid component, and wherein said diol component further comprises 5 to 95 mole percent of residues of said at least one diol monomer is selected from the group consisting of 1,4-cyclohexanedimethanol, neopentyl glycol, and combinations thereof, based on the total moles of said diol component, wherein said polyester polyol has a hydroxyl number of 5 to 60 mg KOH/g and a glass transition temperature of from about 20 to about 70° C.

11. The adhesive composition of claim 1, wherein said isocyanate is selected from the group consisting of 4,4'-MDI, and 2,4'-MDI, and combinations thereof.

12. A hot melt adhesive composition, said adhesive composition comprising:
    a polyurethane prepolymer comprising residues of (i) at least one polyester polyol comprising a diol component having residues of 2,2,4,4-tetraalkyl-1,3-cyclobutanediol (TACD), wherein the at least one polyester polyol has a glass transition temperature (Tg) of −30 to 80° C., and (ii) at least one isocyanate,
    wherein at least one property of said adhesive selected from the group consisting of green strength, heat resistance, and hydrolytic stability is at least 5 percent higher than the same property exhibited by an identical adhesive composition formed with a polyurethane prepolymer having an identical composition as said polyurethane prepolymer, but having residues of a comparative polyester polyol instead of said polyester polyol, wherein said comparative polyester polyol has an acid component comprising 50 mole % terephthalic acid (TPA) and 50 mole % isophthalic acid (IPA) and a diol component comprising 52 mole % neopentyl glycol (NPG) and 48 mole % ethylene glycol with a hydroxyl number of 45 mg KOH/g, a glass transition temperature of 50° C., and a melt viscosity of 130° C. at 60 Pa·s, all other components being the same.

13. The adhesive composition of claim 12, wherein said polyester polyol comprises an acid component having residues of at least one dicarboxyl monomer selected from the group consisting of isophthalic acid or esters thereof, terephthalic acid or esters thereof, phthalic acid or esters thereof, phthalic anhydride, 1,4-cyclohexane-dicarboxylic acid, 1,3-cyclohexanedicarboxylic acid, hexahydrophthalic anhydride, tetrahydrophthalic anhydride, dodecanedioic acid, sebacic acid, azelaic acid, maleic acid or anhydride, fumaric acid, succinic anhydride, succinic acid, adipic acid, dimer acid, hydrogenated dimer acid, 2,6-naphthalenedicarboxylic acid, glutaric acid, and itaconic acid, and combinations thereof and/or wherein said diol component further comprises residues of at least one diol selected from the group consisting of 2,2-dimethyl-1,3-propanediol (neopentyl glycol), 1,2-cyclohexanedimethanol, 1,3-cyclohexanedimethanol, 1,4-cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 1,4-butanediol, 1,3-propanediol, 1,2-propanediol, ethylene glycol, diethylene glycol, 1,6-hexanediol, pentanediol, dodecandiol, and combinations thereof.

14. The adhesive composition of claim 12, wherein said diol component further comprises residues of at least one diol selected from the group consisting of diethylene glycol, 1,4-cyclohexanedimethanol, neopentyl glycol, and combinations thereof, and wherein said at least one diol is present in an amount of at least 3 mole percent, based on the total moles of said diol component.

15. The adhesive composition of claim 12, wherein said polyol has a Tg of 0 to 70° C., a hydroxyl number of 15 to 60 mg KOH/g, and a number average molecular weight of 2500 to 5500 Daltons.

16. The adhesive composition of claim 15, wherein said polyester polyol has an acid component comprising 5 to 100 mole percent of residues of a dicarboxyl monomer selected from the group consisting of 1,4-cyclohexanedicarboxylic acid, adipic acid, isophthalic acid, and hexahydrophthalic anhydride, based on the total moles of said acid component, and wherein said diol component further comprises 5 to 95 mole percent of residues of said at least one diol monomer is selected from the group consisting of 1,4-cyclohexanedimethanol, neopentyl glycol, and combinations thereof, based on the total moles of said diol component, wherein said polyester polyol has a hydroxyl number of 5 to 60 mg KOH/g and a glass transition temperature of from about 20 to about 70° C. and wherein said isocyanate is selected from the group consisting of 4,4'-MDI, 2,4'-MDI, and combinations thereof.

17. A method of using an adhesive composition, said method comprising:
(a) applying an adhesive composition to a first surface of a first substrate to form an adhesive layer, wherein said adhesive composition comprises a polyurethane prepolymer having residues of (i) a polyester polyol comprising residues of 2,2,4,4-tetraalkyl-1,3-cyclobutanediol (TACD), wherein the polyester polyol has a glass transition temperature (Tg) of −30 to 80° C., and (ii) at least one isocyanate;
(b) contacting at least a portion of the adhesive layer with a second surface of a second substrate; and
(c) adhering said first substrate and said second substrate to one another via said adhesive layer thereby forming a layered article.

18. The method of claim 17, wherein at least a portion of said applying includes heating said adhesive composition to form said adhesive layer, wherein at least a portion of said heating is carried out at a temperature of at least 50° C.

19. The method of claim 17, wherein said first and second substrates comprise a material selected from the group consisting of metal, polymer, wood, fabric, leather, and combinations thereof.

20. The method of claim 17, wherein said polyester polyol has an acid component comprising 5 to 100 mole percent of residues of a dicarboxyl monomer selected from the group consisting of 1,4-cyclohexanedicarboxylic acid, adipic acid, isophthalic acid, and hexahydrophthalic anhydride, based on the total moles of said acid component, and wherein said diol component further comprises 5 to 95 mole percent of residues of said at least one diol monomer is selected from the group consisting of 1,4-cyclohexanedimethanol, neopentyl glycol, and combinations thereof, based on the total moles of said diol component, wherein said polyester polyol has a hydroxyl number of 5 to 60 mg KOH/g and a glass transition temperature of from about 20 to about 70° C. and wherein said isocyanate is selected from the group consisting of 4,4'-MDI, 2,4'-MDI, and combinations thereof.

* * * * *